United States Patent
Lynch et al.

(10) Patent No.: US 9,928,751 B2
(45) Date of Patent: *Mar. 27, 2018

(54) GENERIC MEDIA COVERS

(75) Inventors: Ryan S. Lynch, San Francisco, CA (US); Alan Christopher Cannistraro, San Francisco, CA (US); Casey Maureen Dougherty, San Francisco, CA (US); David Makower, Milpitas, CA (US)

(73) Assignee: Apple Inc., Cupertino, CA (US)

(*) Notice: Subject to any disclaimer, the term of this patent is extended or adjusted under 35 U.S.C. 154(b) by 74 days.

This patent is subject to a terminal disclaimer.

(21) Appl. No.: 13/539,171

(22) Filed: Jun. 29, 2012

(65) Prior Publication Data

US 2014/0002484 A1 Jan. 2, 2014

(51) Int. Cl.
*G09B 5/06* (2006.01)
*G06Q 30/06* (2012.01)

(52) U.S. Cl.
CPC ......... *G09B 5/062* (2013.01); *G06Q 30/0601* (2013.01); *G06Q 30/0621* (2013.01)

(58) Field of Classification Search
CPC .............. G06F 3/04; G06F 17/30017; G06F 17/30023; G06F 17/30265; G06F 3/0482; G06Q 30/02; G06Q 10/10; G06Q 50/22; G06Q 30/06; G06T 11/00; G06T 15/005; G11B 27/034; H04N 5/44543; H04N 1/00222; H04N 1/00233; F02M 35/10013; A62B 18/088; B01D 2279/60; A63F 13/12; G06K 9/62; G06N 5/048; G09B 5/062

USPC ....................................................... 345/619
See application file for complete search history.

(56) References Cited

U.S. PATENT DOCUMENTS

| | | | |
|---|---|---|---|
| 6,671,407 B1 | 12/2003 | Venkatesan et al. | |
| 7,500,199 B2 | 3/2009 | Abanami et al. | |
| 7,536,377 B1* | 5/2009 | Milne et al. | |
| 7,545,521 B2 | 6/2009 | Hanamoto et al. | |
| 7,721,200 B2 | 5/2010 | Grigoriadis et al. | |

(Continued)

FOREIGN PATENT DOCUMENTS

TW 200828942 7/2008

OTHER PUBLICATIONS

Anonymous, , "Transformation of a Dominant Colour of an image associated with one or more media content items, for an easy browsing through the items", IP.com No. IPCOM000138062D, Jul. 7, 2006.

(Continued)

*Primary Examiner* — Gregory J Tryder
*Assistant Examiner* — Kwang Lee
(74) *Attorney, Agent, or Firm* — Blank Rome LLP

(57) ABSTRACT

Generic media covers can be generated for digital media items submitted by publishers without a personalized media cover. A generic media cover can be generated for a media item by hashing a unique identifier of the media item that remains consistent throughout the life cycle of the media item. Bytes of the hashed value can be translated into graphic parameters which are used to generate the generic graphic. The graphic parameters can be attached to the generic graphic, thus allowing a user to regenerate the generic graphic at a desired resolution at a later point in time. Also disclosed are techniques for ensuring that generic media covers for a bundle of media items appear substantially similar.

26 Claims, 16 Drawing Sheets

(56) References Cited

U.S. PATENT DOCUMENTS

| | | | |
|---|---|---|---|
| 8,176,338 B1* | 5/2012 | Stringham | 713/193 |
| 8,266,115 B1* | 9/2012 | Park | G06F 17/30864 |
| | | | 707/692 |
| 8,331,566 B1 | 12/2012 | Foote et al. | |
| 8,700,384 B1 | 4/2014 | Lattyak | |
| 2005/0243104 A1 | 11/2005 | Kinghorn | |
| 2006/0064631 A1 | 3/2006 | Parker | |
| 2006/0206811 A1 | 9/2006 | Dowdy | |
| 2006/0230331 A1* | 10/2006 | Abanami et al. | 715/500 |
| 2008/0168365 A1 | 7/2008 | Chaudhri | |
| 2008/0250100 A1* | 10/2008 | Hatanaka | G06F 17/30799 |
| | | | 709/203 |
| 2009/0248672 A1* | 10/2009 | McIntire et al. | 707/5 |
| 2012/0105464 A1 | 5/2012 | Franceus | |
| 2012/0229451 A1 | 9/2012 | Sim | |
| 2013/0076771 A1 | 3/2013 | Bachman et al. | |
| 2013/0125038 A1 | 5/2013 | Horns | |
| 2013/0275254 A1* | 10/2013 | McKinney et al. | 705/26.5 |
| 2014/0304515 A1* | 10/2014 | Feuerman | H04L 63/123 |
| | | | 713/176 |

OTHER PUBLICATIONS

Webpage, , "Learn how to prepare your book images and upload your Kindle book cover to Amazon KDP", May 10, 2012.
International Search Report and Written Opinion from PCT Application No. PCT/US2013/048708 dated Sep. 11, 2013, pp. 1-9.
International Preliminary Report on Patentability from PCT Application No. PCT/US2013/048708 dated Jan. 8, 2015.

* cited by examiner

GENERIC MEDIA COVERS

BACKGROUND

1. Technical Field

The present disclosure relates generally to digital media and more specifically to techniques and systems for generating generic covers for digital media items available on an online store.

2. Introduction

With the growth of the Internet, electronic commerce has become a powerful tool to purchase and sell products. This is particularly true for digital media. Typically a customer, using a browser or an application, can access an online digital media store to browse through and purchase digital media items such as music, movies, audiobooks, and electronic books. Digital media items sold through the online store can be downloaded by the customer. Music producers and publishers can be compensated by the online digital media store for digital media items sold through the store. Each digital media item in the online store can be associated with a media cover (or graphic). A customer can browse through pages of media covers on the online store to search for a desired digital media item. By associating a graphic to each digital media item, the customer experience while browsing is improved.

Music producers and publishers frequently add new digital media items for sale on the online store. Newly added digital media items can sometimes be received without a media cover. This can happen because the artist/author did not provide or did not wish to provide a media cover. In these scenarios, the online store presents the digital media item to customers without a media cover. A media item without a media cover is visually unappealing. This is particularly true when an entire page of digital media items are presented without media covers, thus making it difficult to tell apart one digital media item from another. Thus, there is a need for generic media covers.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating generic media covers for digital media items such as music, movies, audiobooks, and electronic books. As digital media items are received at an online store from a creator or publisher, the digital media items can be preprocessed before being offered for sale. Preprocessing can include ensuring that each digital media item received includes a cover art. A digital media item that was submitted without cover art can be associated with a generic media cover. Generic media covers can be generated by first hashing a unique identifier associated with the digital media item and providing a portion of the hashed value to a dictionary to translate the portion into a graphic parameter. Multiple graphic parameters can be generated from different portions of the hashed value. The graphic parameters can each specify a characteristic for the generic media cover. For example, one graphic parameter can specify a template to use for the generic media cover. The template can be from a collection of available templates that were produced for creating generic media covers. A media cover generator can process the graphic parameters along with attributes of the digital media item such as the author and title of the digital media item to create the generic media cover. The graphic parameters used to generate the generic media cover can be stored with the generic media cover. In one example, the graphic parameters can be embedded in the generic media cover. This can allow a client device or online store to quickly regenerate the generic media cover at a desired resolution. This can improve the quality and clarity of the generic media cover as it is presented on a variety of electronic devices.

Preprocessing can also include updating generic media covers of media items stored in the media library of the online store. As new digital media items are added to the media library, similar media items can be bundled together. The generic media cover for media items in the media bundle can be processed such that the generic media covers use the same template, color scheme, or other characteristic. This can allow bundled media to take on a similar appearance or look in the online store. As a result, digital media items, both with and without generic media covers, can appear the same throughout the entire eco-system, which includes user device libraries, the online store, the cloud, delivery tools, development tools, and other tools.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for systems, techniques, and methods for improved generic media covers for digital media items. The digital media items can include audio books, electronic books (eBooks), music, videos, movies, and other types of digital media. Digital media items generally are presented to a customer with a cover. The cover is used during the life cycle of the media item to allow a customer to associate the media item with an image or graphic, thus making the media item easier to locate amongst other media items. The cover can also be used as a way of branding or marketing the media item. Sometimes a digital media item can be submitted to an online media store for sale and distribution without a cover. In these scenarios where a cover is not included with the media item, the online media store can generate a generic media cover and associate the generic media cover with the media item. Generic media covers can be generated with a random, uniform distribution to improve the likelihood that a page of digital media items presented for sale by an online store will have unique book covers. Unique book covers are more visually appealing and help a customer locate a particular media item.

Figure 1:
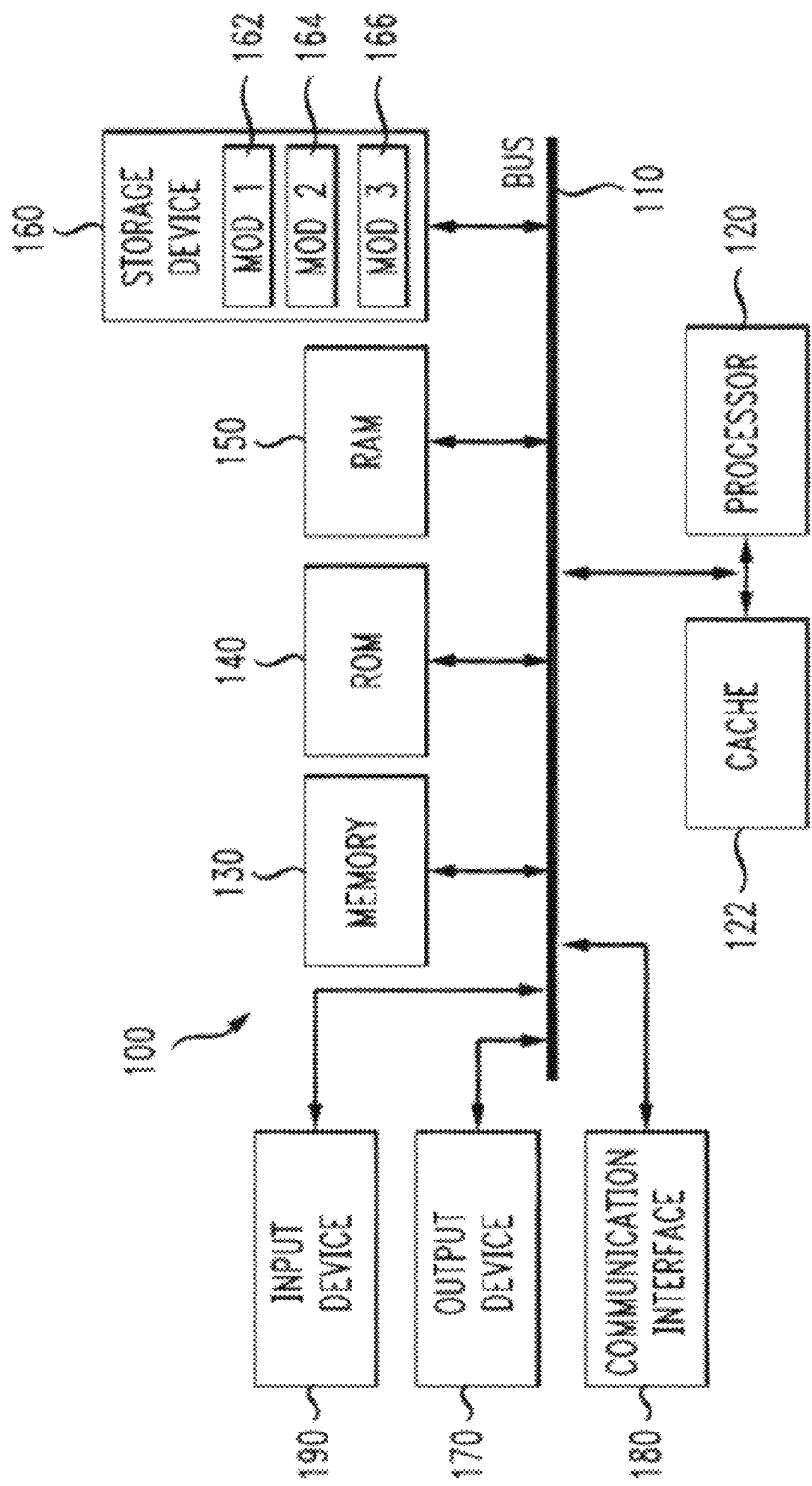
FIG. 1 illustrates an exemplary system embodiment.

A detailed discussion of the methods and systems surrounding the concept of generating generic book covers is described below. First, a brief introductory description of a basic general purpose system or computing device which can be employed to practice the concepts is illustrated in FIG. 1. This is followed by an introductory description of a cloud computing system in FIG. 2. A detailed description of techniques for creating generic book covers follow. Several variations shall be discussed herein as the various embodiments are set forth. The disclosure now turns to FIG. 1.

General System

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, a solid state drive, a tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide non-volatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations. Having disclosed some components of a computing system, the disclosure now turns to a description of cloud computing.

Cloud Computing System

Figure 2:
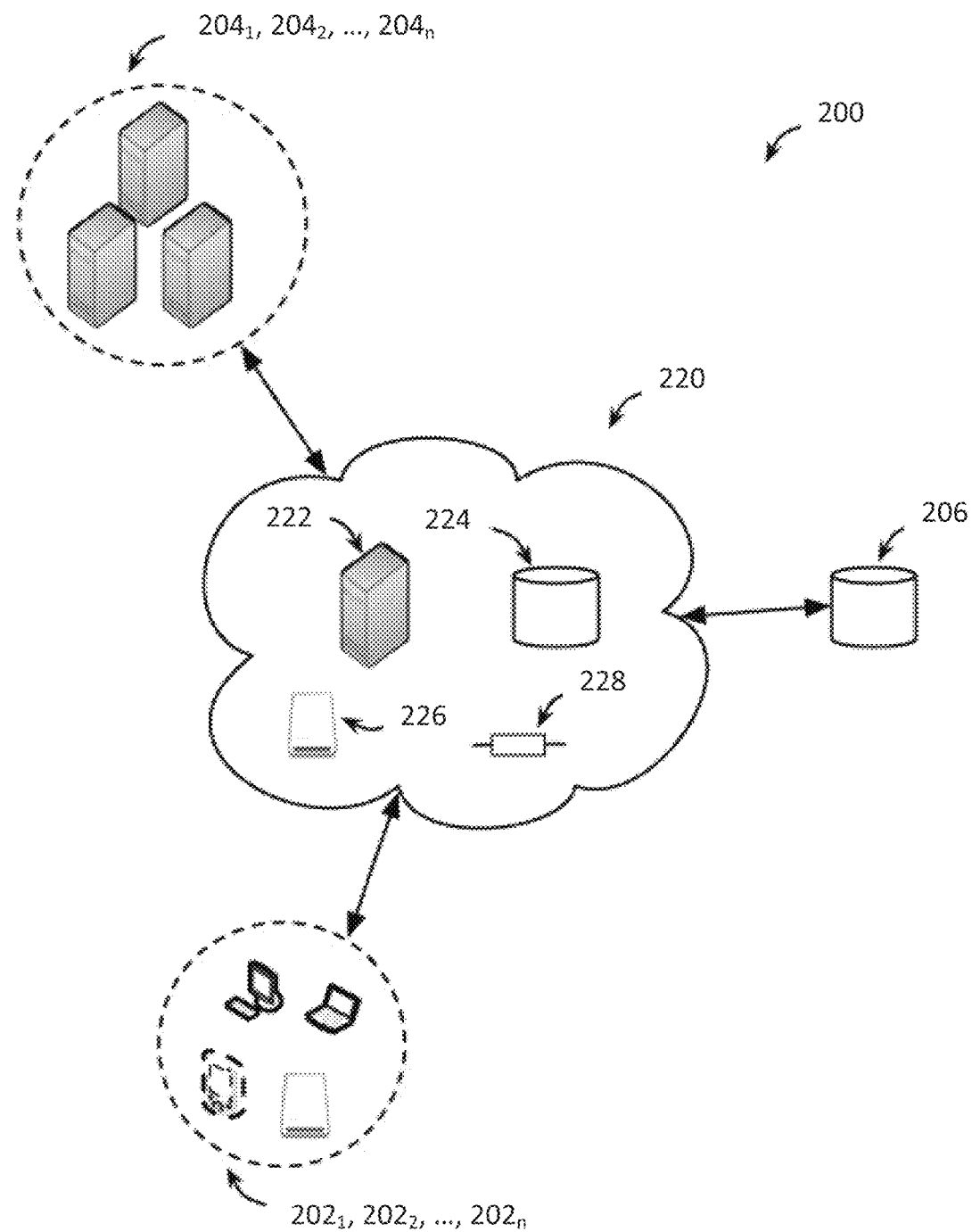
FIG. 2 illustrates an exemplary cloud computing system.

Cloud computing is a type of Internet-based computing in which a variety of resources are hosted and/or controlled by an entity and made available by the entity to authorized users via the Internet. An exemplary cloud computing system configuration 200 is illustrated in FIG. 2 wherein a variety of electronic devices can communicate via a network for purposes of exchanging content and other data. The system can be configured for use on a wide variety of network configurations that facilitate the intercommunication of electronic devices. For example, each of the components of system 200 in FIG. 2 can be implemented in a localized or distributed fashion in a network.

System 200 can be configured to include cloud computing resources 220 (i.e., "the cloud"). The cloud resources can include a variety of hardware and/or software resources, such as cloud servers 222, cloud databases 224, cloud storage 226, cloud networks 228, cloud applications, cloud platforms, and/or any other cloud-based resources. In some cases, the cloud resources are distributed. For example, cloud storage 226 can include multiple storage devices. In some cases, cloud resources can be distributed across multiple cloud computing systems and/or individual network enabled computing devices. For example, cloud computing resources 220 can communicate with servers $204_1$, $204_2, \ldots, 204_n$ (collectively "204"), database 206, and/or any other network enabled computing device to provide the cloud resources.

Furthermore, in some cases, the cloud resources can be redundant. For example, if cloud computing resources 220 are configured to provide data backup services, multiple copies of the data can be stored such that the data is still be available to the user even if a storage resource is offline, busy, or otherwise unavailable to process a request. In another example, if cloud computing resources 220 is configured to provide software, the software can be available from different cloud servers so that the software can be served from any of the different cloud servers. Algorithms can be applied such that the selection criteria such as the closest server, the server with the lowest current load, or other selection criteria, etc. is used to select a server to process a given request.

In system 200, a user interacts with cloud computing resources 220 through user terminals $202_1, 202_2, \ldots, 202_n$ (collectively "202") connected to a network by direct and/or indirect communication. Cloud computing resources 220 can support connections from a variety of different electronic devices, such as servers; desktop computers; mobile computers; handheld communications devices, e.g., mobile phones, smart phones, tablets; set top boxes; network-enabled hard drives; and/or any other network-enabled computing devices. Furthermore, cloud computing resources 220 can concurrently accept connections from and interact with multiple electronic devices. Interaction with the multiple electronic devices can be prioritized or occur simultaneously.

Cloud computing resources 220 can provide cloud resources through a variety of deployment models, such as public, private, community, hybrid, and/or any other cloud deployment model. In some cases, cloud computing resources 220 can support multiple deployment models. For example, cloud computing resources 220 can provide one set of resources through a public deployment model and another set of resources through a private deployment model.

In some configurations, a user terminal 202 can access cloud computing resources 220 from any location where an Internet connection is available. However, in other cases, cloud computing resources 220 can be configured to restrict access to certain resources such that a resource can only be accessed from certain locations. For example, if cloud computing resources 220 are configured to provide a resource using a private deployment model, then cloud computing resources 220 can restrict access to the resource, such as by requiring that a user terminal 202 access the resource from behind a firewall.

Cloud computing resources 220 can provide cloud resources to user terminals 202 through a variety of service models, such as Software as a Service (SaaS), Platforms as a service (PaaS), Infrastructure as a Service (IaaS), and/or any other cloud service models. In some cases, cloud computing resources 220 can provide multiple service models to a user terminal 202. For example, cloud computing resources 220 can provide both SaaS and IaaS to a user terminal 202. In some cases, cloud computing resources 220 can provide different service models to different user terminals 202. For example, cloud computing resources 220 can provide SaaS to user terminal 2021 and PaaS to user terminal 2022.

In some cases, cloud computing resources 220 can maintain an account database. The account database can store profile information for registered users. The profile information can include resource access rights, such as software the user is permitted to use, maximum storage space, etc. The profile information can also include usage information, such as computing resources consumed, data storage location, security settings, personal configuration settings, etc. In some cases, the account database can reside on a database or server remote to cloud computing resources 220 such as servers 204 or database 206.

Cloud computing resources 220 can provide a variety of functionality that requires user interaction. Accordingly, a user interface (UI) can be provided for communicating with cloud computing resources 220 and/or performing tasks associated with the cloud resources. The UI can be accessed via an end user terminal 202 in communication with cloud computing resources 220. The UI can be configured to operate in a variety of client modes, including a fat client mode, a thin client mode, or a hybrid client mode, depending on the storage and processing capabilities of cloud computing resources 220 and/or the user terminal 202. Therefore, a UI can be implemented as a standalone application operating at the user terminal in some embodiments. In other embodiments, a web browser-based portal can be used to provide the UI. Any other configuration to access cloud computing resources 220 can also be used in the various embodiments.

As described above, in some configurations, the cloud computing resources can be used to store user data. The present disclosure contemplates that, in some instances, this gathered data might include personal and/or sensitive data. The present disclosure further contemplates that the entities responsible for the collection, analysis, disclosure, transfer, storage, or other use of such data should implement and consistently use privacy policies and practices that are generally recognized meeting or exceeding industry or governmental requirements for maintaining personal information data private and secure. For example, personal data from users should be collected for legitimate and reasonable uses of the entity and not shared or sold outside of those legitimate uses. Further, such collection should occur only after the informed consent of the users. Additionally, such entities should take any needed steps for safeguarding and securing access to such personal data and ensuring that others with access to the personal data adhere to their privacy and security policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal data. That is, the present disclosure contemplates that hardware and/or software elements can be provided to prevent or block access to such personal data. For example, the present technology can be configured to allow users to select the data that is stored in cloud storage. In another example, the present technology can also be configured to allow a user to specify the data stored in cloud storage that can be shared with other users.

Therefore, although the present disclosure broadly covers use of personal data to implement one or more various disclosed embodiments, the present disclosure also contemplates that the various embodiments can also be implemented without the need for accessing such personal data. That is, the various embodiments of the present technology are not rendered inoperable due to the lack of all or a portion of such personal data. For example, non-personal data can be stored in cloud storage.

Distribution System

Figure 3:
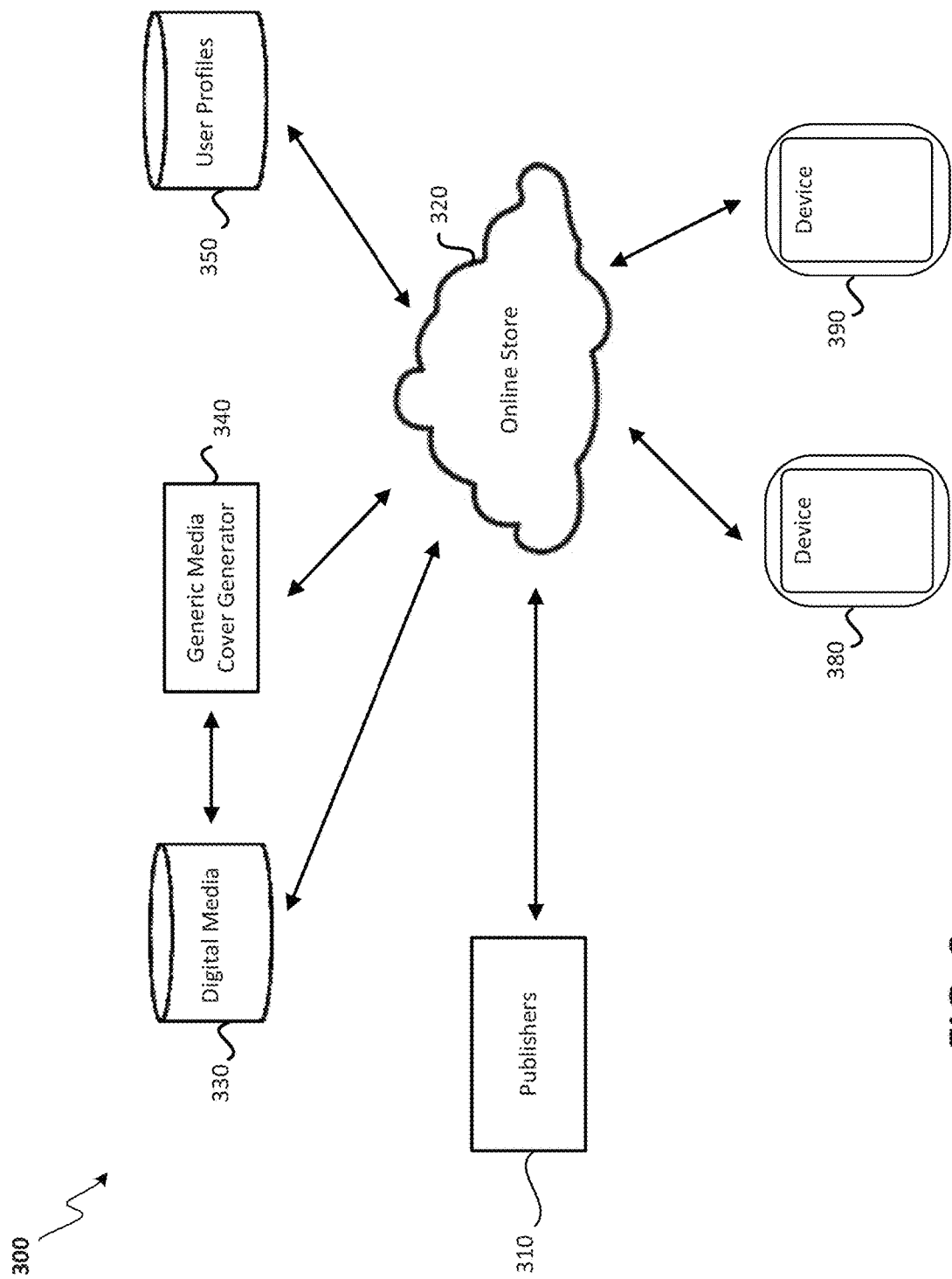
FIG. 3 illustrates an exemplary digital media distribution system.

FIG. 3 illustrates an exemplary digital media distribution system. Distribution system 300 is configured to sell and distribute digital media items, including eBooks, audiobooks, music, videos, movies, and other digital media that is consumable on an electronic device, portable and non-portable. Distribution system 300 includes publishers 310, online store 320, digital media database 330, generic media cover generator 340, user profiles 350, and user devices 380 and 390. Online store 320 can be located on the cloud and be configured to include one or more cloud computing resources of FIG. 2. Online store 320 can be configured to transmit distribute and manage digital media rights for digital media in digital media database 380. Online store 320 can transmit data that allows an operator of a user device to browse digital media items available from online store 320. Requested media items can be processed by online store 320 and transmitted to the requesting device. Customers of online store 320 can transmit requests to online store 320 to download media items. Each customer can have an associated user profile stored in user profiles 350. The user profile can store information about the customer, such as billing information to purchase digital media items and access rights to digital media items. For example, a customer operating device 380 can have a user profile stored in user profiles 350. Online store 320 can grant access to download digital media items to device 380 that the customer has a right to access. Access rights can be stored in the user profile. For digital media items that the customer does not have a right to access, the customer can optionally purchase the digital media item. Purchased digital media item can be downloaded and re-downloaded by devices operated by the customer.

Distribution system 300 also includes publishers 310. Publishers 310 can be configured to generate new content that can be sold and distributed by online store 320. The new content can include software or eBooks, songs, videos, movies, audiobooks, and other forms of digital media. Here, publishers 310 can submit new digital media items to online store 320. The new digital media items can be stored in digital media database 330 for sale by online store 320. In some examples, a new digital media item received by online store 320 can be preprocessed. Preprocessing can include preparing the digital media item for distribution, such as testing the content, verifying metadata associated with the digital media items, which are described in further detail below, or confirming certain fields have a permitted value. For example, new digital media items can be preprocessed by generic media cover generator 340. Generic media cover generator 340 can be configured to generate generic media covers for new digital media items that are submitted without a media cover. As described below in connection with FIGS. 4, and 14 generic media cover generator 340 can also be configured to determine whether a given digital media item requires a generic media cover. After new digital media items are preprocessed, which can include processing the new digital media item through generic media cover generator 340, the processed new digital media items can be stored in digital media database 330. A customer requesting a new digital media item can download the new digital media item from online store 320 to a device operated by the customer.

Figure 4:
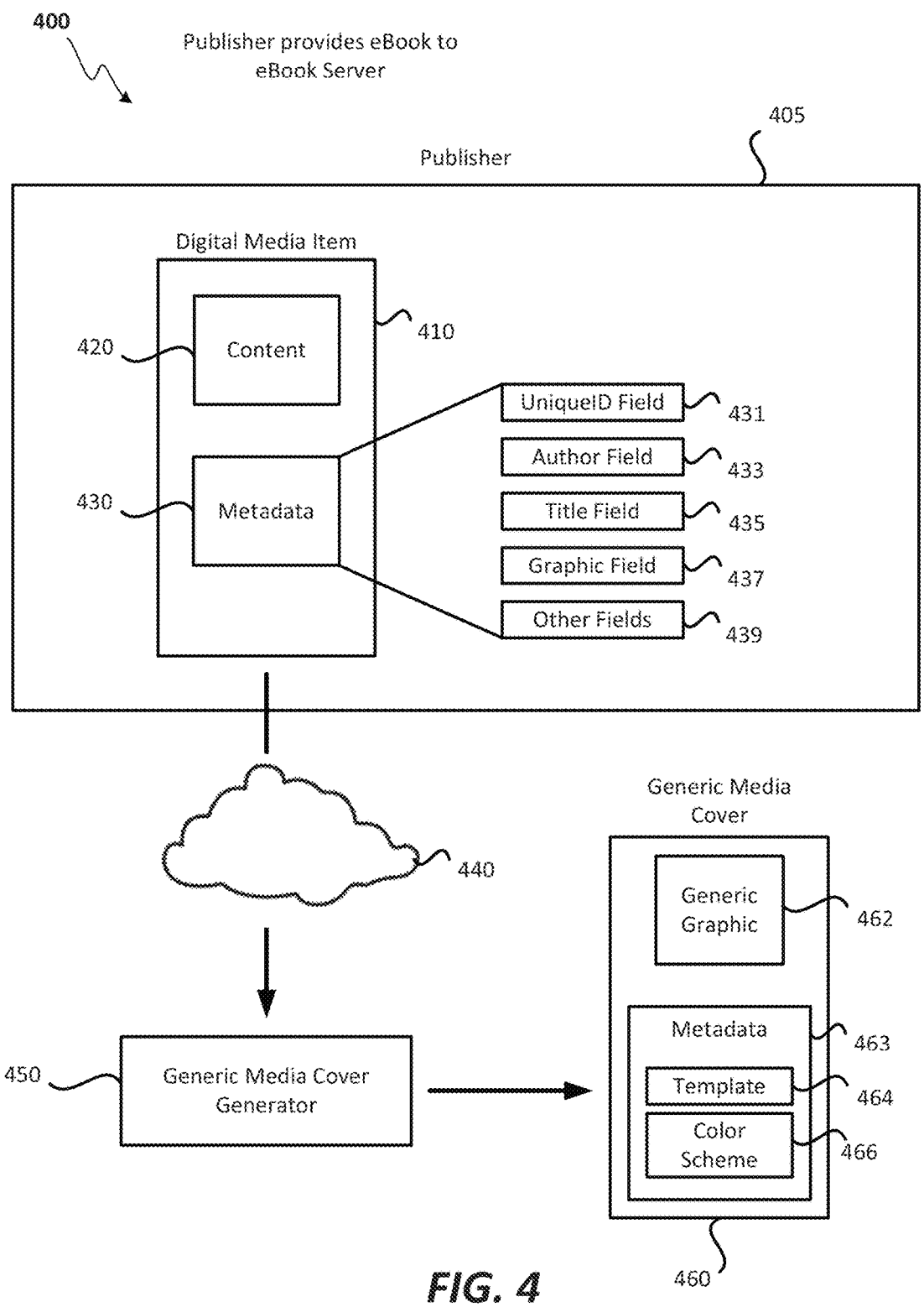
FIG. 4 illustrates an exemplary eBook submitted by a publisher.

FIG. 4 illustrates an exemplary eBook submitted by a publisher. System 400 includes publisher 405, network 440, and generic media cover generator 450. Publisher 405 can be configured to create new digital media item 410. The digital media item can be an audiobook, an eBook, song, video, or movie. Digital media item 410 can include content 420 and metadata 430. Content 420 can be configured to store the content that is to be presented to the user while metadata 430 can be configured to store the description, details, or other information associated with the digital media file. Content 420 can be stored as a .pdf, .epub, .mp3, .avi, .mp4, or other audio/video/data file formats. In some examples, metadata 430 can be appended, prepended, or otherwise attached to content 420 as a single file. In other examples, metadata 430 can be a separate file that is associated with content 420.

Metadata 430 can include a plurality of fields. Here, metadata 430 includes UniqueID field 431, author field 433, title field 435, graphic field 437, and other fields 439. UniqueID field 431 can be configured to store a unique identifier associated with the digital media item. The unique identifier can be used to uniquely identify the digital media item to an online store. In some examples, the unique identifier can be provided to the digital media item after or during preprocessing of the digital media item before it is made available on the online store. In other words, UniqueID field 431 can be empty when the digital media item is received from the publisher. For example, the online store can generate and assign a unique identifier to a digital media item after the media item is received from the publisher. The unique identifier would uniquely identify the digital media item from other digital media items available on the online store. Author field 433 can be configured to store the name or names of the authors of the digital media item. Similarly, title field 435 can be configured to store the title of the digital media item. Graphics field 437 can be configured to store a graphic or cover art. The graphic or cover art can be an image that is associated with the digital media item. By associating the graphic or cover art with the digital media item, the digital media item becomes more visually appealing and can further help customers locate and distinguish the digital media item from other media items Newly created digital media item 410 can be transmitted from publisher 405 to generic media cover generator 450 via network 440. Network 440 can be a local area network, wide area network, internet, or other network. Generic media cover generator 450 can be configured to receive a digital media item and optionally, generate a generic media cover. The generic media cover, which can stored in a .jpg, .tif, .raw, or other image format, can be embedded in generic field 437. For example, generic media cover generator 450 can determine or ensure that digital media item 410 includes a graphic in graphical field 437. In some implementations, generic media cover generator 450 can include logic to determine whether graphic field 437 includes an appropriate value. For example, the data in graphic field 437 can be previewed to confirm that the image is presentable by the online store. If a graphic does not exist or if preview fails, generic media cover generator 450 can generate a generic graphic.

The generic media cover 460 can include generic graphic 462 and optionally metadata 463. Metadata 463, which can be embedded as part of the header of the generic media cover 460 or remain a separate file that is associated with generic media cover 460, contains information associated with the generic graphic or the digital media item. For instance, metadata 463 can include the resolution of the generic graphic, the graphic parameters used to generate the generic graphic, the author/title of the digital media item, and publication information of the digital media item (e.g., date of publication, publisher, etc.). Metadata 463 can be accessed by a client device to regenerate the generic graphic at a specified resolution. For example, the generic graphic can be regenerated according to display specifications of the client device. A client device can regenerate the generic graphic at a resolution associated with the client device once the digital media item has been downloaded to the client device. The metadata can also be used to generate animations involving the generic graphic. The animations can be used by an application running on the client application to present the digital media item. In other examples, the online store can generate the generic graphic in at least one resolution specified by a client device and transmit at least one generic graphic to the client device. For example, an online store can store the desired resolutions for each client device. When a client requests a digital media item, the online store can generate animations, images, cover art, generic graphics, etc. to be transmitted to the client device. In yet other examples, a database of generic graphics can be stored on the online store and transmitted to the client device on demand. In this example, generic media cover 460 includes generic graphic 462 and metadata 463, which includes template 464 and color scheme 466. Template 464 can specify a particular template from a collection of templates that was used to generate the generic graphic. Similarly, color scheme 466 can specify a particular color scheme out of available color schemes that was used to generate the generic graphic. The template and color scheme specified for a particular media item can be chosen according to metadata associated with the digital media item. For example, the color scheme and template chosen for a particular digital media item can be selected based on the UniqueID field, author name, title, or other field associated with that particular digital media item that is consistent throughout the eBook's lifecycle. In one example, the online store specifies the template and/or color scheme when the digital media is being processed to be sold on the online store. This can occur after the online store receives the digital media from the publisher but before the online store sells the digital media to customers. In other examples, the template and color scheme can be specified by the entity during generation of the generic graphic for the first time, whether that is on the client device, the publisher, or other online store. Although metadata 463 is shown in this figure as being part of generic media cover 460, in other examples metadata 463 can alternatively be included as part of generic graphic 462. For instance, metadata 463 can be included in the header of generic graphic 462 or embedded as part of generic graphic 462. In scenarios where metadata 463 is embedded in generic graphic 462, generic media cover 460 may become extraneous and thus can be removed from the system 400. Generic media cover generator 450 would simply output generic graphic 462.

In some examples, the process for selecting a color scheme, template, or other option used in generating the generic cover can include logic to analyze available metadata associated with the digital media item. This can allow an application running on a client device or online store to generate a generic cover in different scenarios where metadata may be missing from the digital media item. For example, an eBook may not have a UniqueID if the eBook is not offered for sale by the online store. The eBook may have come from a different distributor and thus does not have a UniqueID that was generated by the online store. When an eBook is missing the UniqueID, the online store may use different metadata to generate the generic cover. In some examples, the metadata used can be metadata that remains consistent throughout the lifecycle of the media item, such as the eBook's ISBN number or the eBook's manifest (the entire header of the eBook). By using metadata that remains consistent throughout the lifecycle of the eBook to select the options used to generate the generic cover, a family or related digital media items can use the same generic cover as will be described below. A client device or online store can regenerate the generic graphic at a desired resolution by using metadata of the digital media item, such as the author and title, plus the options used in generating the generic graphic, such as the template and the color scheme. Regeneration of the generic graphic can be desirable since it allows the generic graphic to be displayed at the optimal resolution for a particular device. For example, the resolution of a screen on a laptop, a screen on a tablet, and a screen on a smart phone can all be different. Given the resolution of the screen on a particular device, the generic graphic can be most appealing when presented to the user at a given resolution. Rather than upsizing or downsizing the generic graphic attached to the digital media item (which can create loss in the clarity and quality of the image), the generic graphic can be regenerated to an optimal resolution to be displayed on the user device. Different sizes of the generic graphic can also be used by an application running on the user device. An application on the user device or the online store can include the collection of templates, color schemes, and other generic parameters that are used to regenerate the generic graphic. The application can also include a process to regenerate the generic graphic using the generic parameters. The generic graphics can be regenerated at desired resolutions as they are needed during run time of the application or pre-generated for the display of a particular device.

Figure 5:
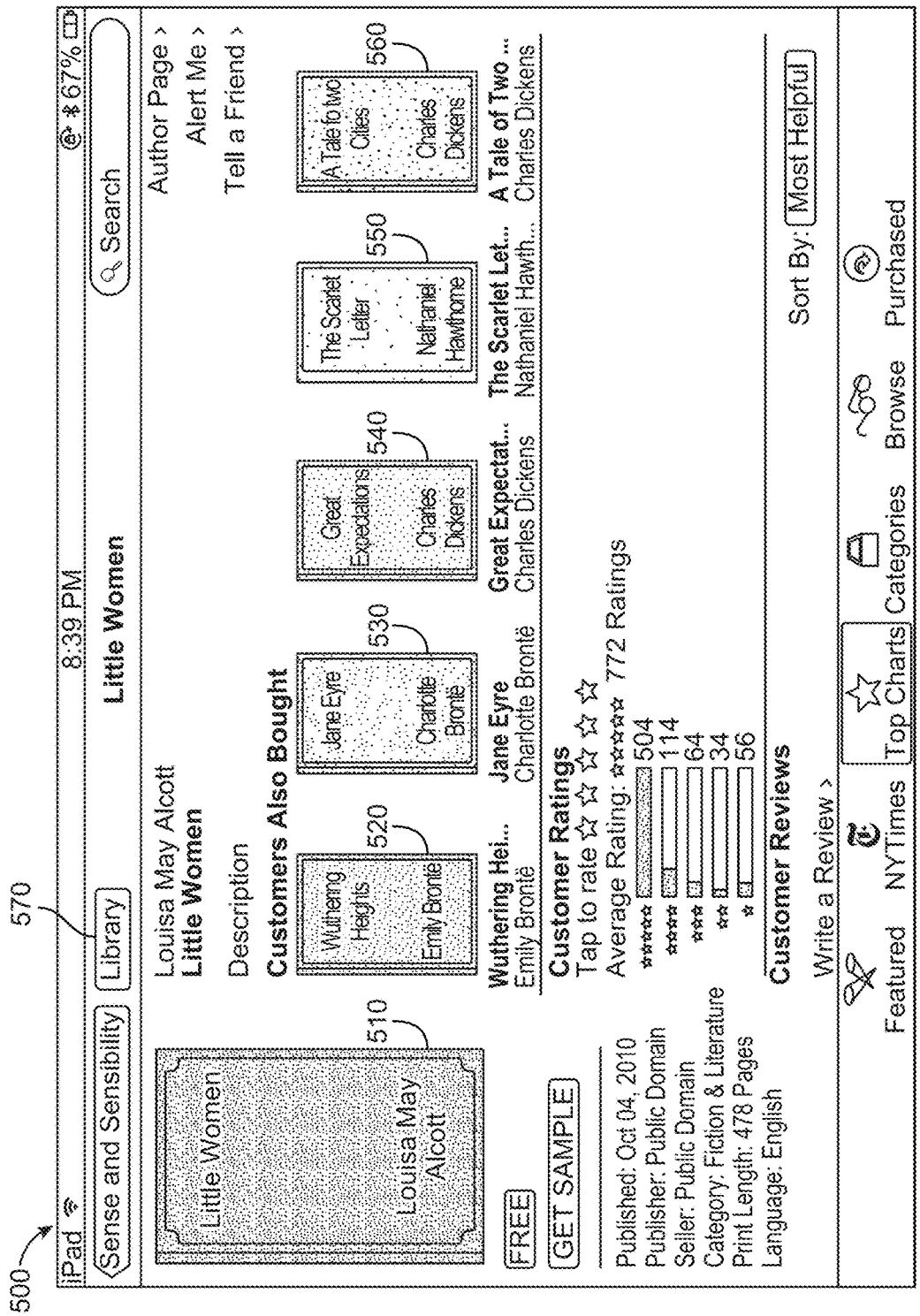
FIG. 5 illustrates an exemplary graphical user interface generated by an application running on a client device.

FIG. 5 illustrates an exemplary graphical user interface generated by an application running on a client device. Here, the client device is a tablet computing device. The application can include a store view (as shown in FIG. 5) and a library view (examples shown in FIGS. 6-7). The graphical user interface (GUI) can present to a user information received from an online store. Here, GUI 500 provides information about a selected eBook available from an online store. Generic graphic 510 representing the selected digital media item is presented as a larger image (or at a higher resolution) than generic graphics 520-560 which represent digital media items recommended by the online store. As shown, graphics 520-560 include different templates and color schemes that are based upon metadata that remains consistent during the lifecycle of the digital media items, such as the UniqueID, ISBN, author, title, etc. In some examples, the metadata can be unique. If one of the recommended digital media items is subsequently selected by the user, a new GUI can be presented to the user where the generic graphic associated with the selected digital media item can be substantially located at the location of generic graphic 510. The selected digital media item can be enlarged, either through upsizing or regenerating the generic graphic, to be substantially the same size as generic graphic 510. As shown, different sizes/resolutions of the generic graphic may be required during execution of the application running on the client device. The different sizes/resolutions of the generic graphic can be regenerated by the application running on the client device or alternatively by the online store and transmitted to the client device. By regenerating the generic graphic, a more visually appealing graphic can be presented to the user. A user input received on icon 570 can present a library view of the application. The library view can be configured to allow a user to read eBooks on the client device. Examples of the library view are shown in FIGS. 6-9.

Figure 6:
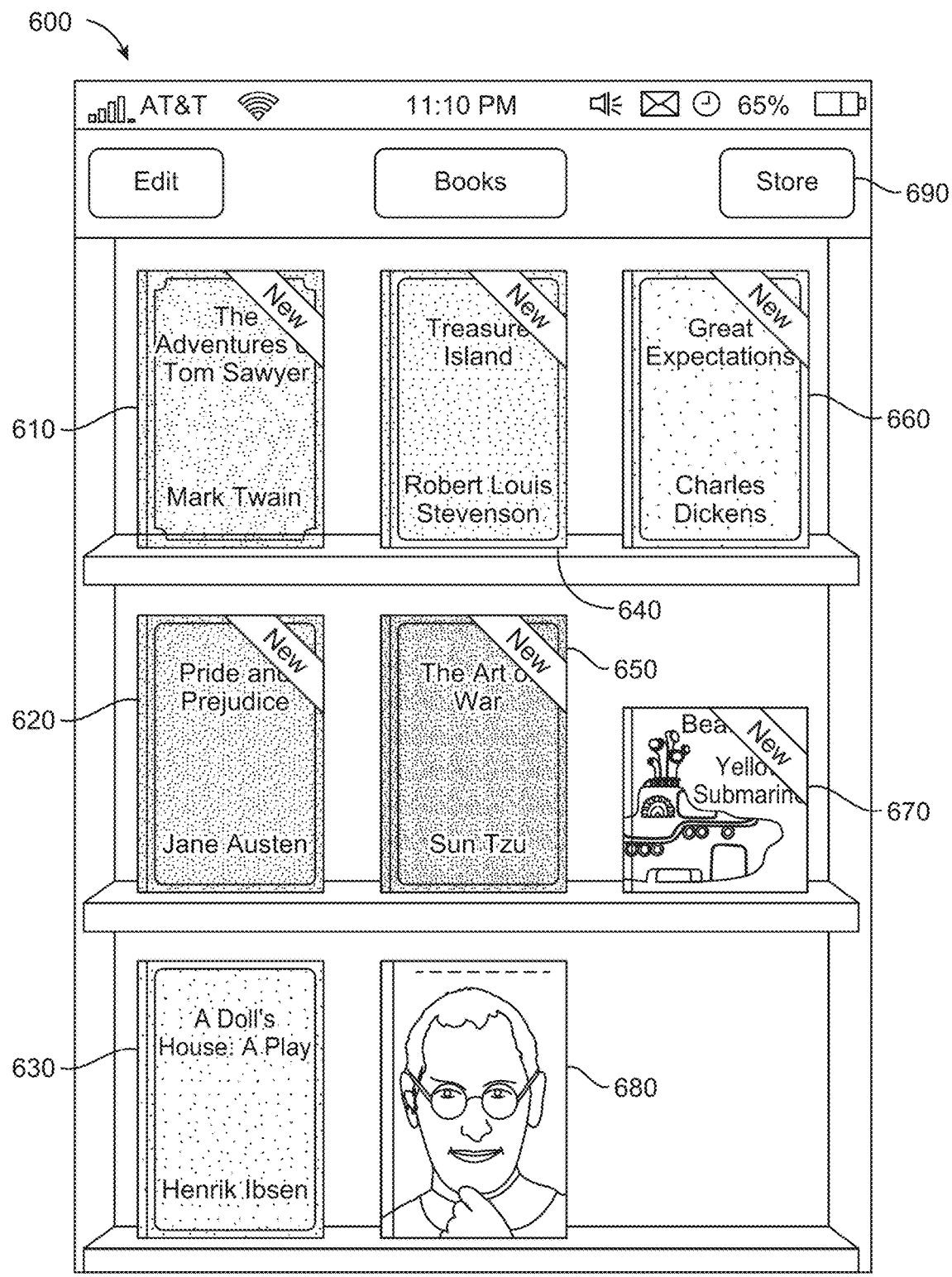
FIG. 6 illustrates an exemplary library view generated by an application running on a client device.

FIG. 6 illustrates an exemplary library view generated by an application running on a client device. Here, the client device is a smartphone. Library view 600 presents a plurality of eBooks to a user of the client device. Each eBook is associated with a graphic that represents the eBook. As shown, eBooks 610, 620, 630, 640, 650, 660 are represented by a generic graphic while eBooks 670, 680 are represented by a personalized graphic. A personalized graphic that needs to be converted to a different size or resolution is resized. In contrast, a generic graphic to be converted to a different size or resolution can be regenerated by using graphic parameters that are embedded in or stored withthe generic graphic. The graphic parameters can describe characteristics of the generic graphic, such as the template or color scheme used for the generic graphic. Library view 600 also includes store icon 690 that is configured to take the user back to the store view. An exemplary store view is shown in FIG. 5 above.

Figure 7A:
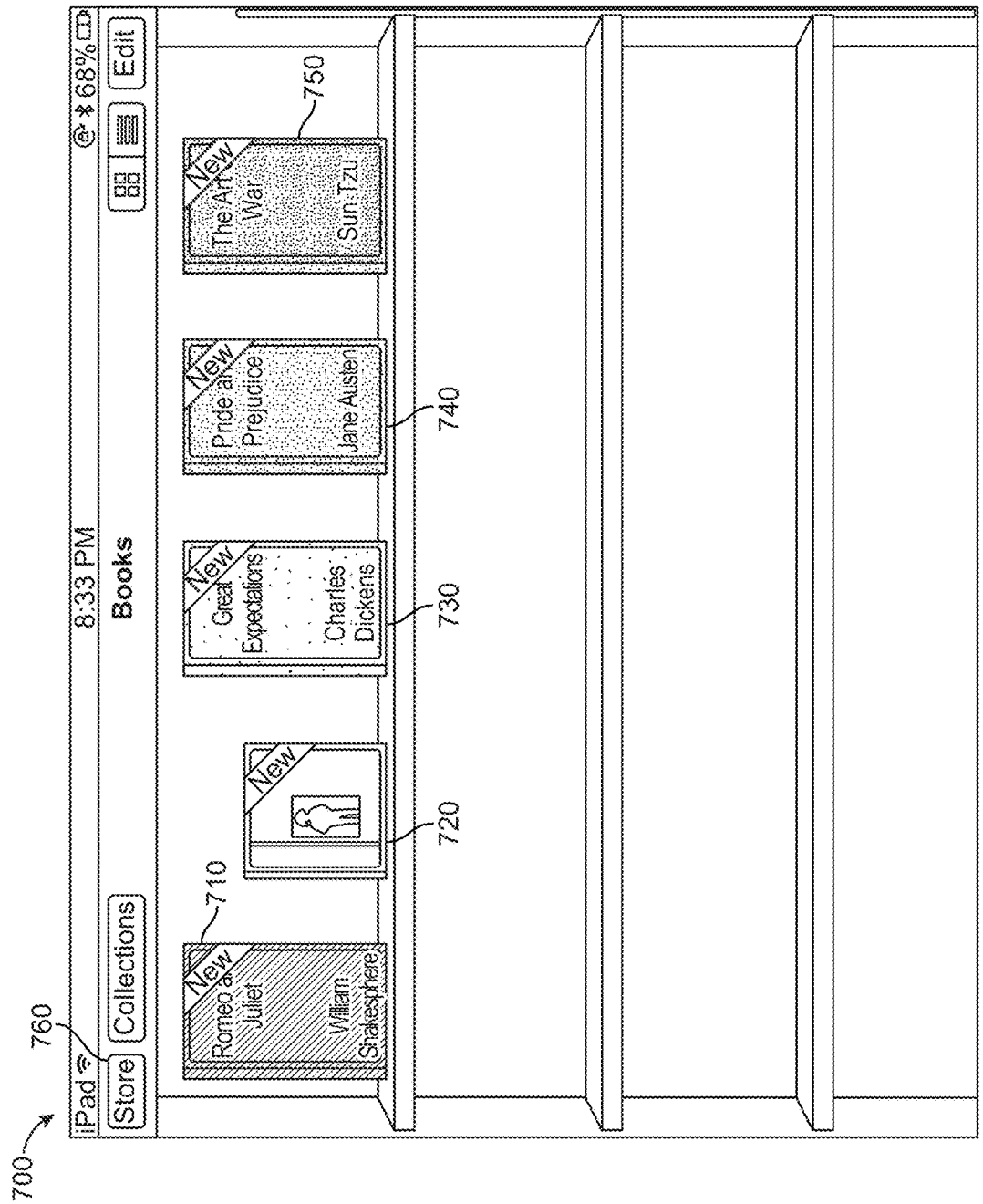
FIG. 7A illustrates another exemplary library view generated by an application running on a client device.

FIG. 7A illustrates another exemplary library view generated by an application running on a client device. Here, the client device is a tablet computing device. Library view 700 presents a plurality of eBooks to a user of the client device. The eBooks are presented to the user in a landscape orientation versus the portrait orientation as shown in FIG. 6. In some examples, the visual orientation can be user selected or determined by the orientation of client device. Depending on the orientation (e.g., landscape versus portrait) or the type of device (e.g., smartphone, tablet computing device, desktop computing device, etc.), the optimal size and/or resolution for a generic graphic can change. For example, the number of eBooks that can be simultaneously presented on a display can be different depending on the orientation or the device type. The dimensions of a display in a specific orientation can cause the application running on the client device to regenerate the generic graphic to a different size so that a desired number of eBooks can be simultaneously presented on the display. As shown here, digital media items 710, 730, 740, 750 are represented by generic graphics, while digital media item 720 is represented by a custom graphic. Library view 700 also includes store icon 760 that is configured to take the user back to the store view. An exemplary store view is shown in FIG. 5 above.

Figure 7B:
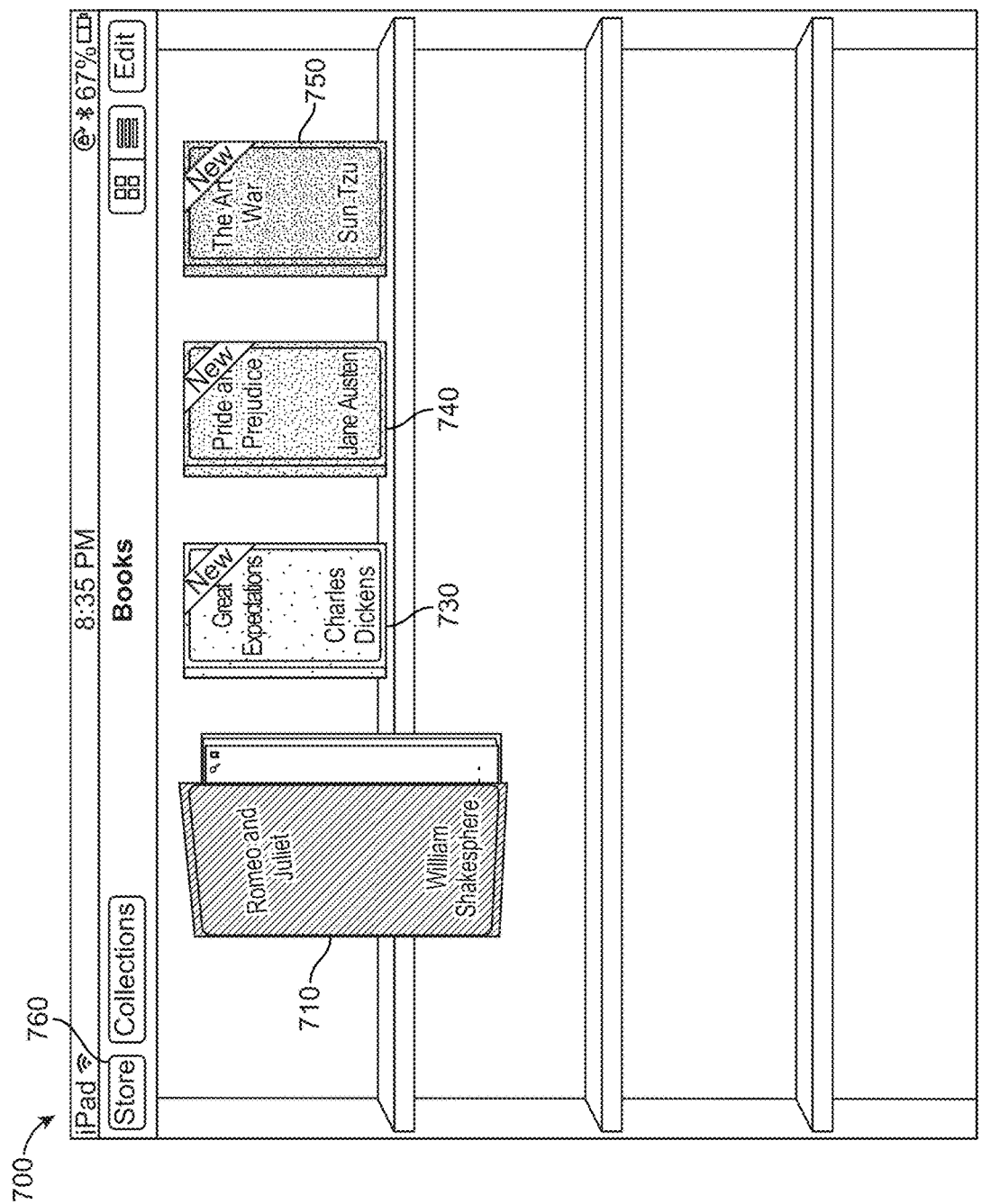
FIG. 7B illustrates another exemplary library view generated by an application running on a client device.

FIG. 7B illustrates another exemplary library view generated by an application running on a client device. After the user has selected eBook 710, the application can generate an animation of eBook 710 opening as the eBook moves towards the center of the display. The animation is provided to improve the user experience by simulating a user taking a physical book off of a bookshelf and opening the book. As shown, the animation can include moving eBook 710 off the bookshelf. During the animation, the graphic representing the cover of eBook 710 can be resized. If the graphic representing the cover of eBook 710 is a generic graphic as shown here, the graphic can be generated by the application rather than resizing or scaling to create a more visually appealing graphic. The angle, the size, and/or the animation of the generic graphic can be generated by the application using graphic parameters associated with the generic graphic that can be found on eBook 710. Other eBooks such as eBooks 730-750 can remain the same on the bookshelf.

During the animation, eBooks on the bookshelf can be covered by the animating eBook. For example, eBook 720 is covered by eBook 710 in this view.

Figure 7C:
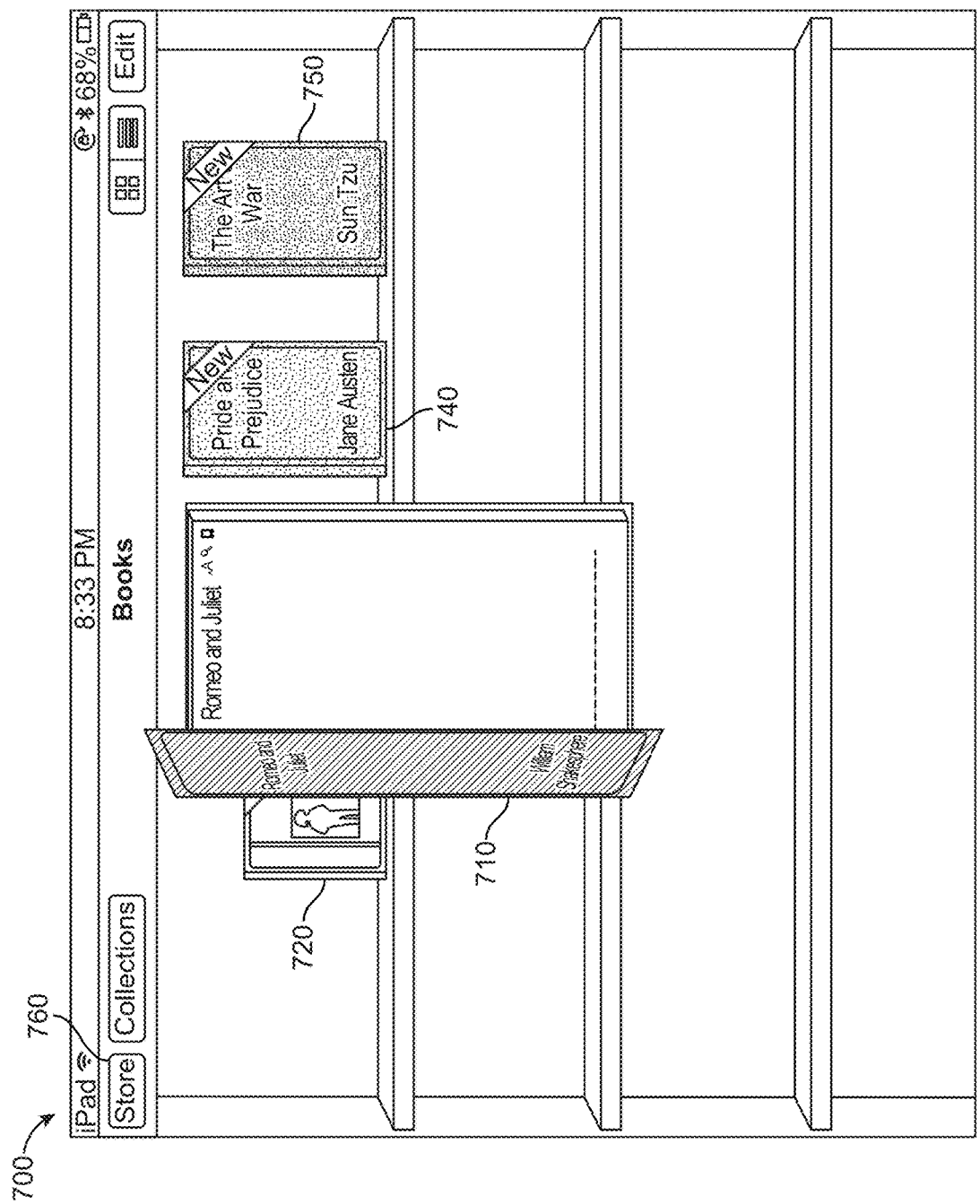
FIG. 7C illustrates another exemplary library view generated by an application running on a client device.

FIG. 7C illustrates another exemplary library view generated by an application running on a client device. As shown here, the animation of the graphic representing eBook 710 has continued moving from FIG. 7B and is now closer towards the center of the display. As eBook 710 has taken on an open appearance, the cover of eBook 710 has become distorted. The application can use graphic parameters associated with the generic graphic embedded in eBook 710 to generate the distorted cover. Here, eBook 710 has now covered eBook 730 as it grows in size and approaches the middle of the display.

Generic Media Cover Generator

Figure 8:
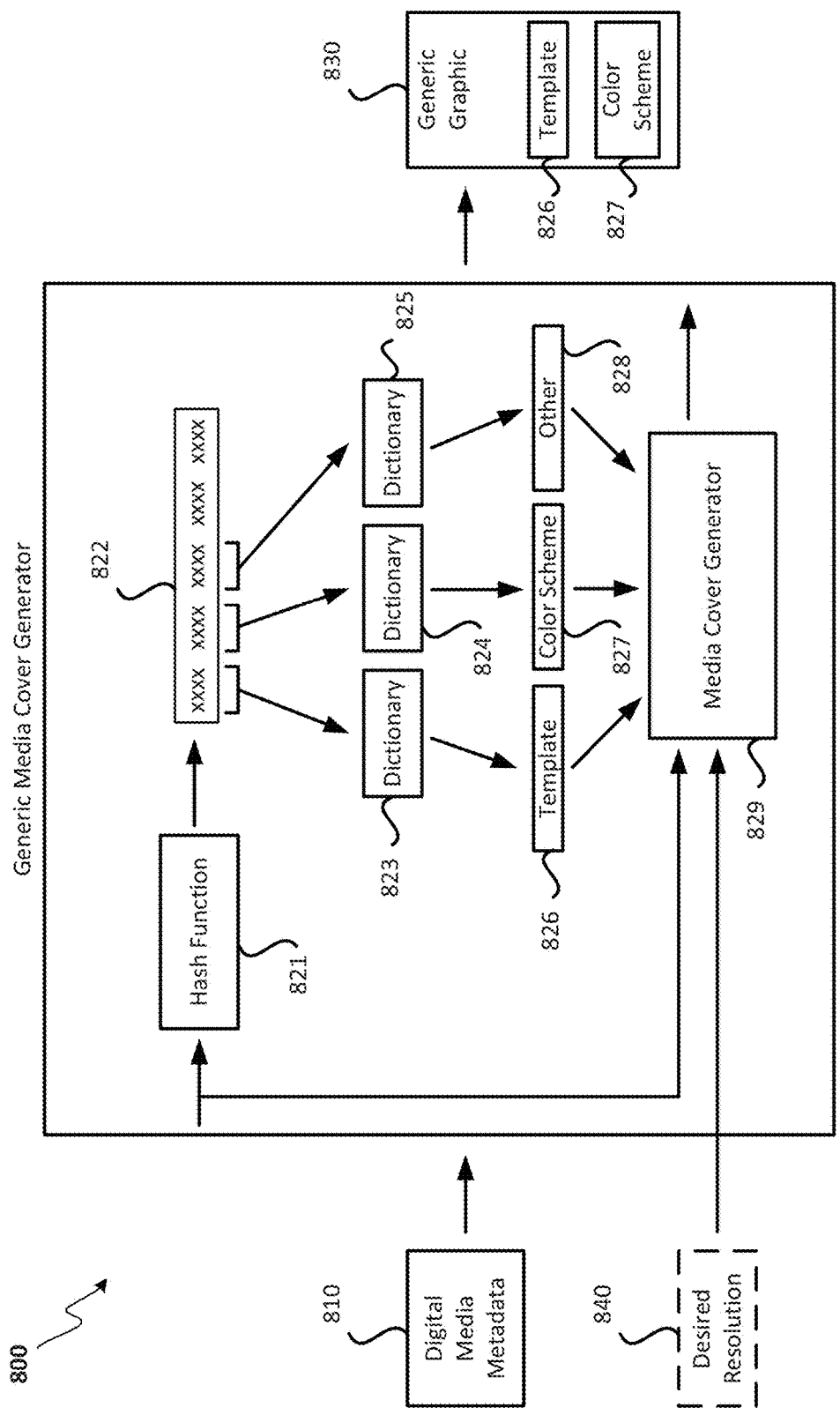
FIG. 8 illustrates an exemplary generic media cover generator.

FIG. 8 illustrates an exemplary generic media cover generator. The generic media cover generator can be similar or substantially similar to generic media cover generator 450 of FIG. 4. The generic media cover generator can be implemented on a device responsible for generating generic media covers. In some implementations, the generic media cover generator can be implemented on the online store, other device on the server-side, or even on the client-side such as the client device. A generic media cover generator can be configured to generate a generic graphic or a generic cover for a digital media item from metadata of the digital media item. In one example, the generic media cover generator can be used by an online store to generate a generic cover for a digital media item that has been submitted without a graphic or cover art. As shown here, generic media cover generator 800 can be configured to receive digital media metadata 810. Digital media metadata 810 can be processed by generic media cover generator 800 to generate generic graphic 830. Processing of eBook metadata 810 can begin with hash function 821 hashing data from eBook metadata 810 to generate hash value 822. In some examples, the data hashed from digital media metadata 810 can be data that remains consistent throughout the lifecycle of the digital media item. For example, the UniqueID of an eBook, an ISBN of the eBook, or the eBook manifest can be hashed to generate hash value 822. These variables can be prioritized in an order of preference. If the most preferred variable is available, that variable will be used in the hash function. If the most preferred variable is not available, the next most preferred variable is used, if available. By hashing metadata that remains consistent, the hash value generated from data from hashing digital media metadata 810 will also remain consistent. In some examples, hash function 821 can be a hash that results in a uniform distribution of hash values. By providing a uniformly distributed hash function, the templates, color schemes, or other graphic parameters can also likely be uniformly distributed. This can increase the likelihood that the graphic parameters are equally used in the media library. In one example, hash function 821 can be configured to implement a MD5 hash.

Generic media cover generator 800 can be configured to transmit a portion of hash value 822 to a dictionary. The dictionary can be configured to translate the portion of hash value 822 to a graphic parameter. The graphic parameter can be used by generic media cover generator 800 to generate a generic graphic. For example, a first byte of hash value 822 can be transmitted to a dictionary, which in turn translates the byte into one of a plurality of available templates. A second byte of hash value 822 can be translated by another dictionary into one of a plurality of color schemes. In other words, each dictionary of generic media cover generator 800 can be configured to translate a predetermined byte (or other portion) of a hash value into a graphic parameter. Here, dictionary 823 can be configured to translate the first byte of hash value 822 to template 826, dictionary 824 can be configured to translate the second byte of hash value 822 to color scheme 827, and dictionary 825 can be configured to translate the third byte of hash value 822 to another graphic parameter. In other examples, different portions of hash value 822 can be mapped to different dictionaries. In yet other examples, more or fewer graphic parameters can be translated from dictionaries using portions of a hashed value Generic media cover generator 800 can further include media cover generator 829. Media cover generator 829 can be configured to receive portions of digital media metadata 810 and graphic parameters (template 826, color scheme 827, and optionally other parameters 828). The graphic parameters can be used to generate a generic graphic while the portions of digital media metadata can be used to overlay text on the generated generic graphic. In other examples, the received data can be processed in other ways by media cover generator 829 to generate generic graphic 830. In one example, media cover generator 829 can receive a template and/or color scheme. Generic graphic 830 can be generated by using the template and/or color scheme. Media cover generator 829 can subsequently receive an author and title from digital media metadata 810. The author and title (and optionally other metadata) can be rendered on top of the generic graphic. In some examples, desired resolution 840 can optionally be received by media cover generator 829. Generic graphic 830 can be generated by media cover generator 829 at the resolution specified by desired resolution 840. If the desired resolution 840 is not specified, generic graphic 829 can be generated at a default resolution or size. For example, generic graphic 829 can by default be generated at a resolution for presenting the generic graphic on the online store. This image can be known as a generic store graphic. Thus, the digital media item would be stored on the online store with a generic store graphic that is already at an optimal size for presentation on the online store to potential customers. Digital media items with generic store graphics therefore do not need to resize the image before presentation on the online store. The resulting generic graphic can be output from generic media cover 800. In one example, media cover generator 829 can further be configured to store the graphic parameters on generic graphic 830. For example, template 826 and color scheme 827 can be included as metadata on generic graphic 830. By storing the graphic parameters on generic graphic 830, a client application or other application accessing generic graphic 830 can have the option of regenerating the generic graphic to a desired resolution or size without the extra steps of the hash function and the dictionaries. In other examples, generic graphic 830 does not include any of the graphic parameters used generating generic graphic 830. The graphic parameters can be regenerated, as needed, by using metadata of the digital media item. This can result in a more compact generic graphic. However, regenerating the generic graphic would require more processing power since the hash function and the dictionary functionality would be performed again.

Generic graphic 830 can be configured to support different versions of the application. For older versions of the application that are unable to support the regeneration of graphics, the application can resize or scale generic graphic 830 to the desired resolution or size. The older version of the application can also create animation sequences based on the genric graphic 830. These older versions of the application may not support regeneration of graphics because the version of the application does not include a media cover generator module capable of regenerating graphics based on graphics parameters. Newer versions of the application can include the media cover generator module and thus are capable of regenerating generic graphic 830 to the desired resolution or size, thus resulting in a graphic with higher clarity than if the graphic were scaled, upsized, or downsized. Alternatively if the media cover generator module is not operational, generic graphic 830 can be upsized, downsized, or otherwise scaled to achieve the desired resolution or size. A personalized media cover can be handled by the application in a similar manner when a specific resolution or size is desired.

Figure 9:
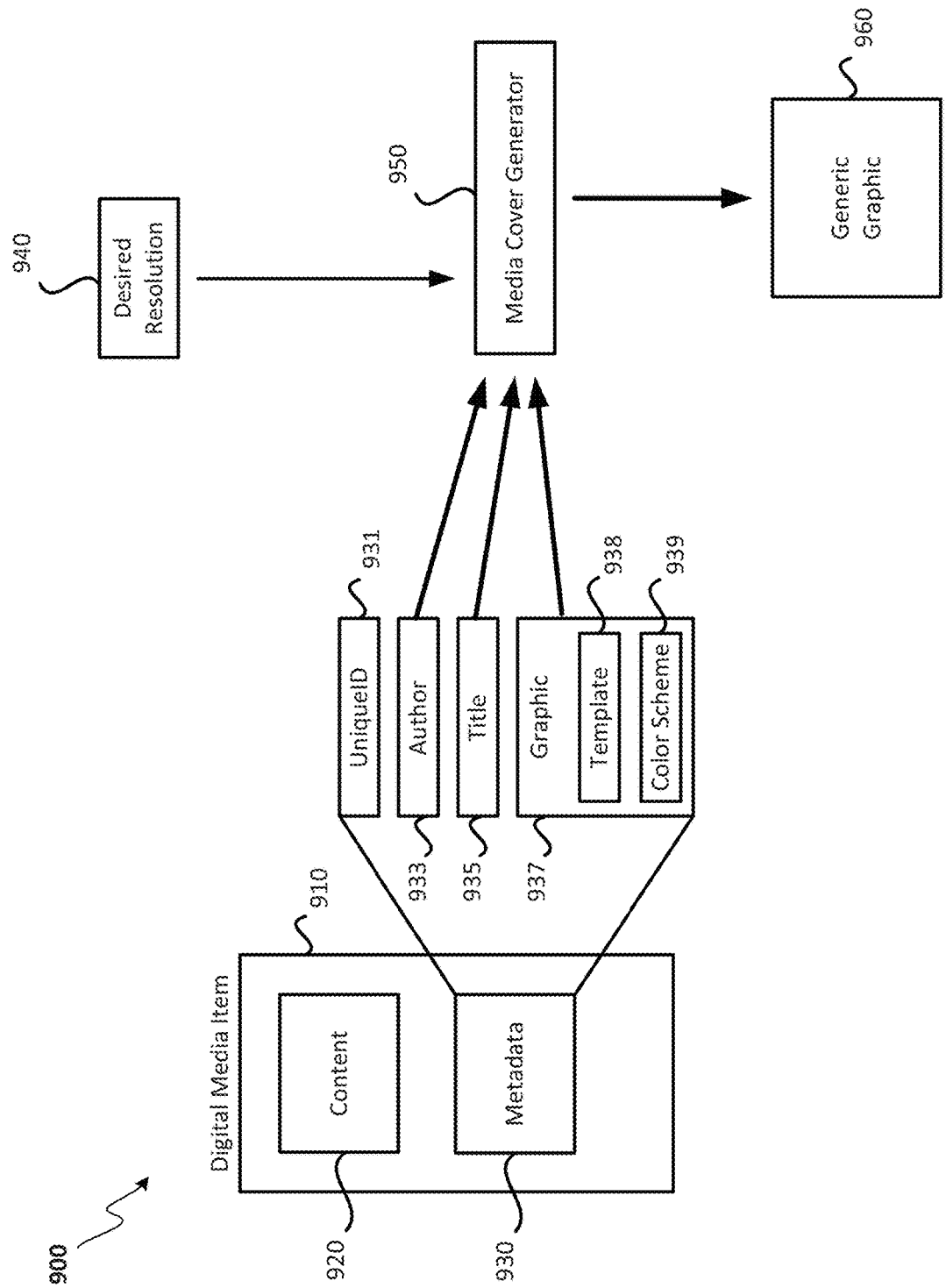
FIG. 9 illustrates an exemplary client device regenerating a generic graphic.

FIG. 9 illustrates an exemplary client device regenerating a generic graphic. Client device 900 includes media cover generator 950 and digital media item 910, which includes content 920 and metadata 930. Metadata 930 includes UniqueID 931, author 933, title 935, and graphic 937. Graphic 937 includes template 938 and color scheme 939. Template 938 and color scheme 939 can be embedded in the header of graphic 937. Media cover generator 950 can be a module in an application running on the client device or an online store. Media cover generator 950 can be similar or substantially similar to media cover generator 829 of FIG. 8. As shown, media cover generator 960 can be configured to receive metadata 930 from digital media item 910 and in response, generate generic graphic 960. Generic graphic 960 can be generated at the desired resolution specified by desired resolution 940, and optionally include graphic parameters. The desired resolution can be based on display specifications of client device 900, the orientation of client device 900, or a resolution specified by the user. In this example, media cover generator generates a generic graphic at a desired resolution based on template 938 and color scheme 939. Author 933 and title 935 are then rendered on the generic graphic at the desired resolution to form generic graphic 960. This ensures that the graphics and the text that form generic graphic 960 are of high quality, clear, and visually appealing to the user. While the generic graphic 960 is being generated, client device 900 can present graphic 937 to the user, in a resized or rescaled form. In other words, a resized or rescaled version of graphic 937 can be presented to the user while graphic 960 is being generated. Once generic graphic 960 is generated, graphic 960 can be swapped in for graphic 937.

Although FIG. 9 describes the regeneration of the generic graphic on the client device, media cover generator 950 can also be implemented on the server-side. This can create a more compact system on the client device. If media cover generator 950 were implemented on the server-side, client device 900 would send a request to the server-side for a generic media item. The request can include the template, the color scheme, the author, the title, the desired resolution and other metadata that is used to regenerate the generic media item. The server-side can input the information from the request to media cover generator 950 and create a generic graphic, which is subsequently transmitted to the client device. While the client is waiting for the server's response, graphic 937 can be used in a rescaled or resized form. In some examples, digital media item 910, when initially downloaded to client device 900, can contain graphic 937 in a resolution that is preferred for the client device. The server transmitting digital media item 910 to the client device can preprocess digital media item 910 so that graphic 937 transmitted with digital media item 910 is at the optimal resolution for the client's device.

Alternatively, media cover generator 950 can be implemented similarly or substantially similar to generic media cover generator 800 of FIG. 8. By maintaining similar components on the client and the server for generating generic covers, graphic parameters do not need to be embedded in, stored on, or otherwise associated with the digital media item or the generic graphic. The client can recreate the graphic parameters during the regeneration process and therefore generate the same generic cover, but at a desired resolution or size.

In yet other examples, client device 900 can transmit a request to regenerate a graphic at a desired resolution to a server. The request can include the desired resolution plus metadata of the digital media item, such as uniqueID 931, author 933, title, 935, or graphic 937. The server can process the desired resolution and the metadata in a similar manner as described in FIG. 8. In some examples, the server can use the metadata received to uniquely identify the digital media item on the server, and subsequently use the located digital media item in the generation of the generic cover. In response to the request, the server can transmit generic graphic 960 at the desired resolution to the client device. By maintaining the creation of the generic graphics on the server, the version of the application on the client becomes irrelevant and thus, all clients are capable of presented generic graphics that have been generated to be optimized for the client device.

Notifications

Figure 10:
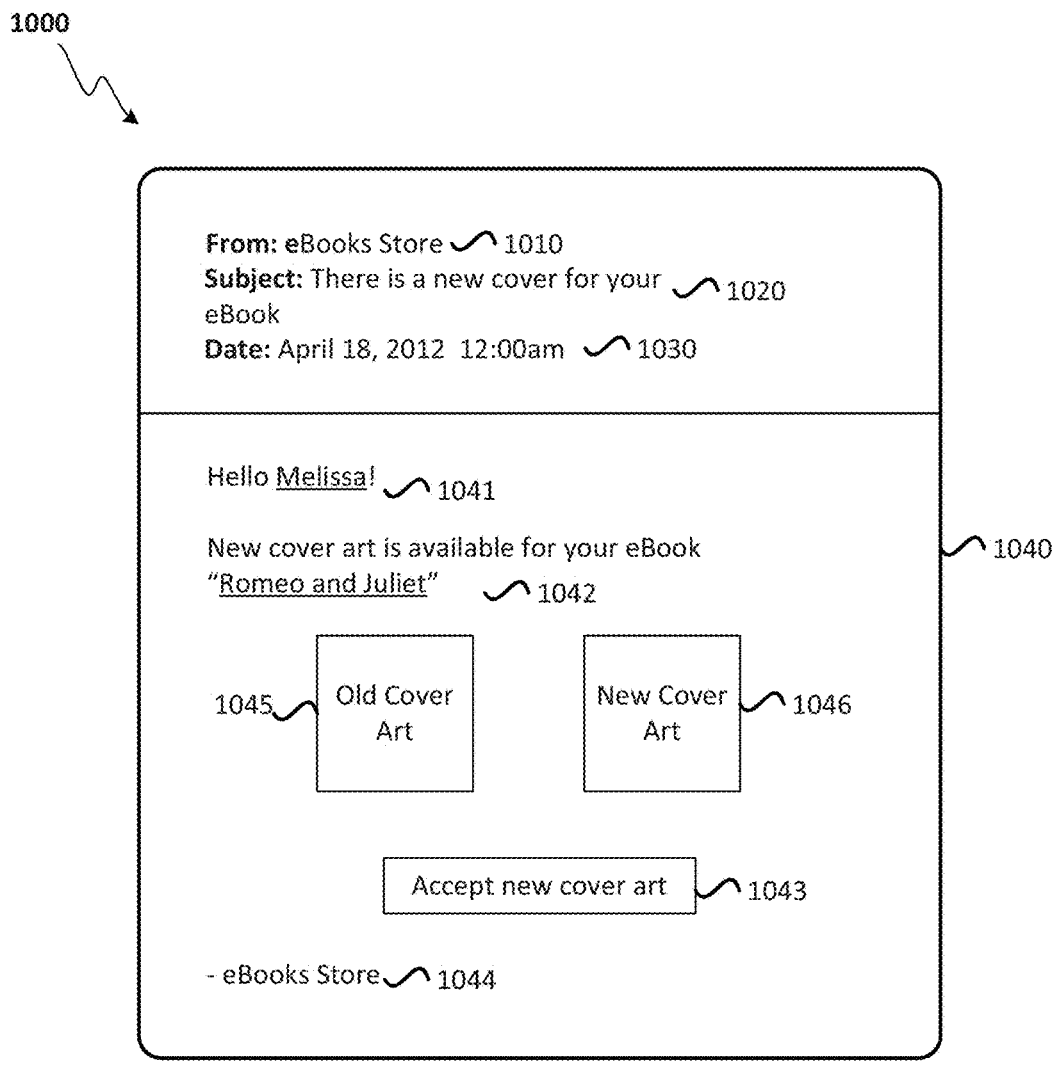
FIG. 10 illustrates an exemplary notification.

FIG. 10 illustrates an exemplary notification. A notification can be transmitted from an online store to customers when a digital media item has been updated with a new media cover. A new media cover can replace an existing media cover (either personal or generic) when it is desirable to associate the digital media item with other related media items. For example, a new media cover can be associated with an eBook when a movie related to the eBook is available on the online store. By maintaining the same cover art for the eBook and the movie, related digital media items can be cross promoted. Moreover, the sale of the movie can lead to the sale of the eBook since the customer that has purchased the movie will already be familiar with the cover art and thus, automatically realized that the eBook is related to the movie. Cross associating the media covers for analogous digital media items (e.g., different variations of a story being presented in different formats such as book, audiobook, and movie or a series of media items) can lead to more sales and a more user friendly experience since the user would be able to visually distinguish that a set of media items are related. To synchronize cover art for different types of digital media items, different online stores may need to communicate with one another. For example, an eBook online store may need to communicate with a music online store or a movie online store to synchronize the cover art.

Notification 1000 is an exemplary email to notify a customer that updated cover art is available for a digital media item that the customer owns. In some examples, the online store may automatically update cover art for media items in the customer's library and the notification can serve to notify the customer that the cover art has changed. In other examples, the online store can transmit a notification and provide the customer the option to download the updated cover art. It may be desirable to ask the customer before updating the cover art on a digital media item to prevent customer confusion when the customer attempts to browse by cover art for the digital media item. The notification can be transmitted from an online store to an email account associated with the recipient's user account. As shown, notification 1000 includes a sender field 1010. Sender field 1010 displays the name of the party that sent the email. In some examples, sender field 1010 can be automatically populated with the default email address of an online store. Depending on the media type, the default media address can change. For example, if the notification is for updated eBook cover art, the sender can be the "eBooks Store". Here, sender field 1010 is automatically populated with the name "eBooks Store." Notification 1000 can also include subject field 1020. Subject field 1020 provides the recipient a description of the subject matter in this email. In some examples, subject line 1020 can be automatically populated with a generic statement such as "There is a new cover for your eBook." Notification 1000 can also include date stamp 1030. Date stamp 1030 provides information about the time and/or date that the email was sent from the online store.

Notification 1000 can further include message body 1040. Message body 1040 can be automatically generated. Message body 1040 can include recipients name 1041, text 1042 notifying the recipient of the updated cover art, the old cover art 1045, the new cover art 1046, an option to accept and download the new cover art 1043, and signature 1044. The accept option 1043 can also be replaced with links to accept or deny the new cover art. If the new cover art is denied, the digital media item stored on the client device retains the old cover art. However if the digital media item were to be re-downloaded from the online store, the digital media item would be downloaded with the updated cover art. If the new cover art is accepted, a request can be transmitted from the client device for the new cover art. Based on the response received from the recipient, the online store can transmit the new cover art to the client device. The new cover art can include metadata specifying the generic parameters used when creating the new cover art. This metadata can be embedded as part of the new cover art, or alternatively be embedded in the digital media. The new cover art can replace the old cover art in the metadata of the digital media (see element 437 in FIG. 4). Signature 1044 can be applied at the end of the message.

Figure 11:
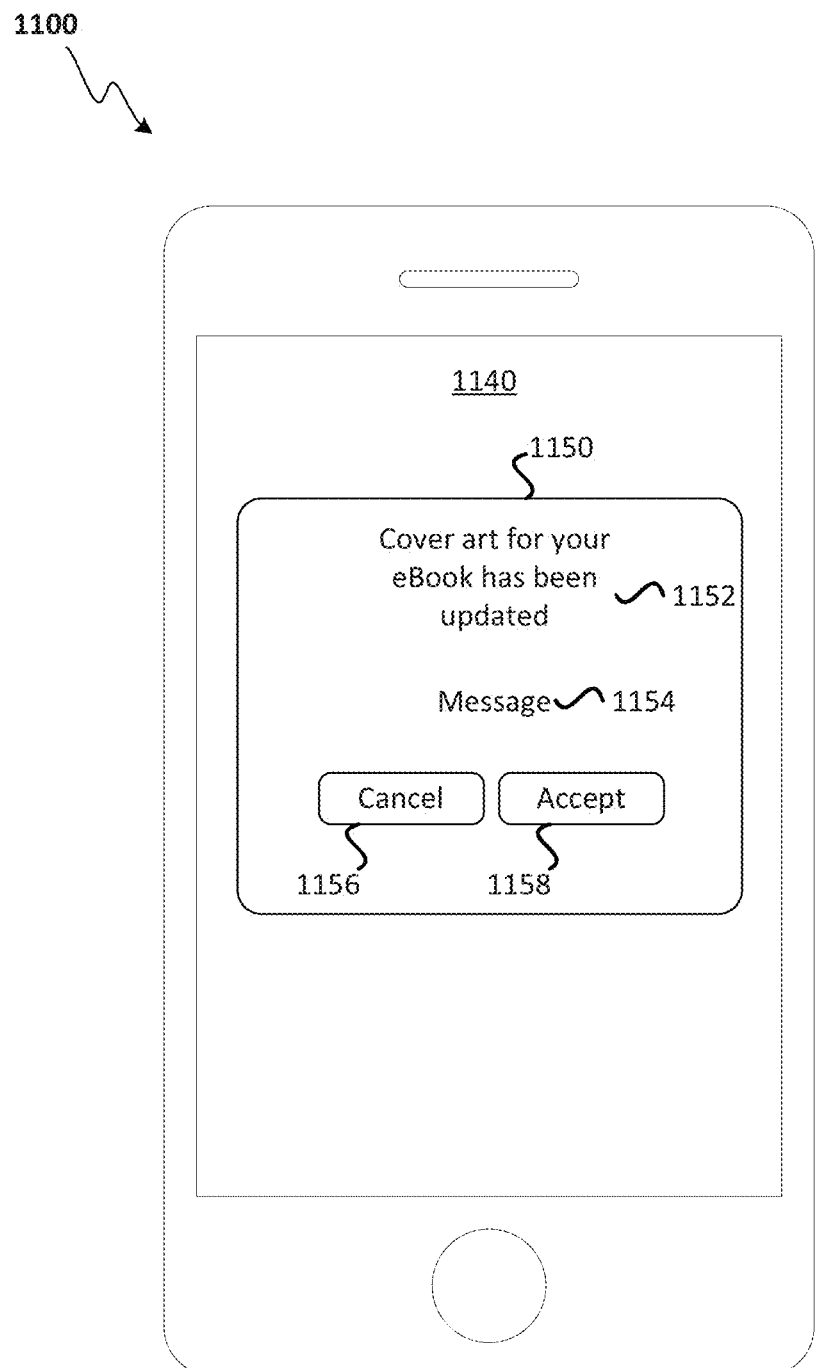
FIG. 11 illustrates another exemplary notification.

FIG. 11 illustrates another exemplary notification. Notification 1150 received on electronic device 1100 and displayed on display 1140 is a push notification. A push notification is a communication initiated by the cloud or other central server that is sent to a recipient. Push notifications allow a recipient to receive updates or new messages without initiating a request to the central server for communications. Notification 1150 can be a text message that is received on electronic device 1100, a pop-up notification received on electronic device 1100, or other notification received by electronic device 1100. As shown here, notification 1150 includes title 1152, message 1154, and options 1156 and 1158. Title 1152 can be a title line associated with notification 1150, such as "Cover art for your eBook has been updated." Similarly, message 1154 can be a message describing the contents of notification 1150. For example, the message can state "Your eBook titled <Title of eBook> has new cover art. Would you like to update the cover art?" In some examples, title 1152 and/or message 1154 can be automatically generated by the online store.

Options 1156 and 1158 can provide the recipient user-selectable options to respond to the message. There can be more or fewer options. For example, the recipient can cancel notification 1150 by selecting option 1156. By cancelling the notification, electronic device 110 does not respond to the notification. However, electronic device 1100 can still respond to notification 1150 at a later point in time through an application on electronic device 1100 that maintains all received notifications. Alternatively, the user can accept the updated album art by selecting option 1158. When the user accepts the updated album art, a notification can be sent from electronic device 1100 to inform the online store of the event. As a result of the event, the online store can transmit the updated album art to electronic device 1100. The online store can also optionally transmit the updated album art to other electronic devices that belong to the user. In some examples, selecting option 1158 can link the user to another application configured to manage the user's media library. The recipient can review the digital media items owned and decide whether to update the cover art.

In other examples, the application of these notifications can be extended past updates for cover art. For example, the same or similar notifications can be configured to notify a customer when an eBook has been updated on the server. An eBook can be updated on the server at particular milestones of the eBook's lifecycle. For instance, an eBook can be updated at milestones such as an official version of the eBook is released, an updated version is released, or addendum is added to the eBook. During these milestones, a new or updated version of the eBook can replace an older version of the eBook. A customer with an older version of the eBook can receive a notification from the server to notify the customer that a new or updated version of the eBook is available for download. If the user wishes to receive the update, the new version is transmitted to the customer's device and replaces the older version. In one example, the older version may no longer be supported by the server and thus, once the update occurs, the older version of the eBook can no longer be retrieved. In other examples, the server can still support older versions of the eBook, thus allowing customers to retrieve different versions of an eBook.

Exemplary Methods

Figure 12:
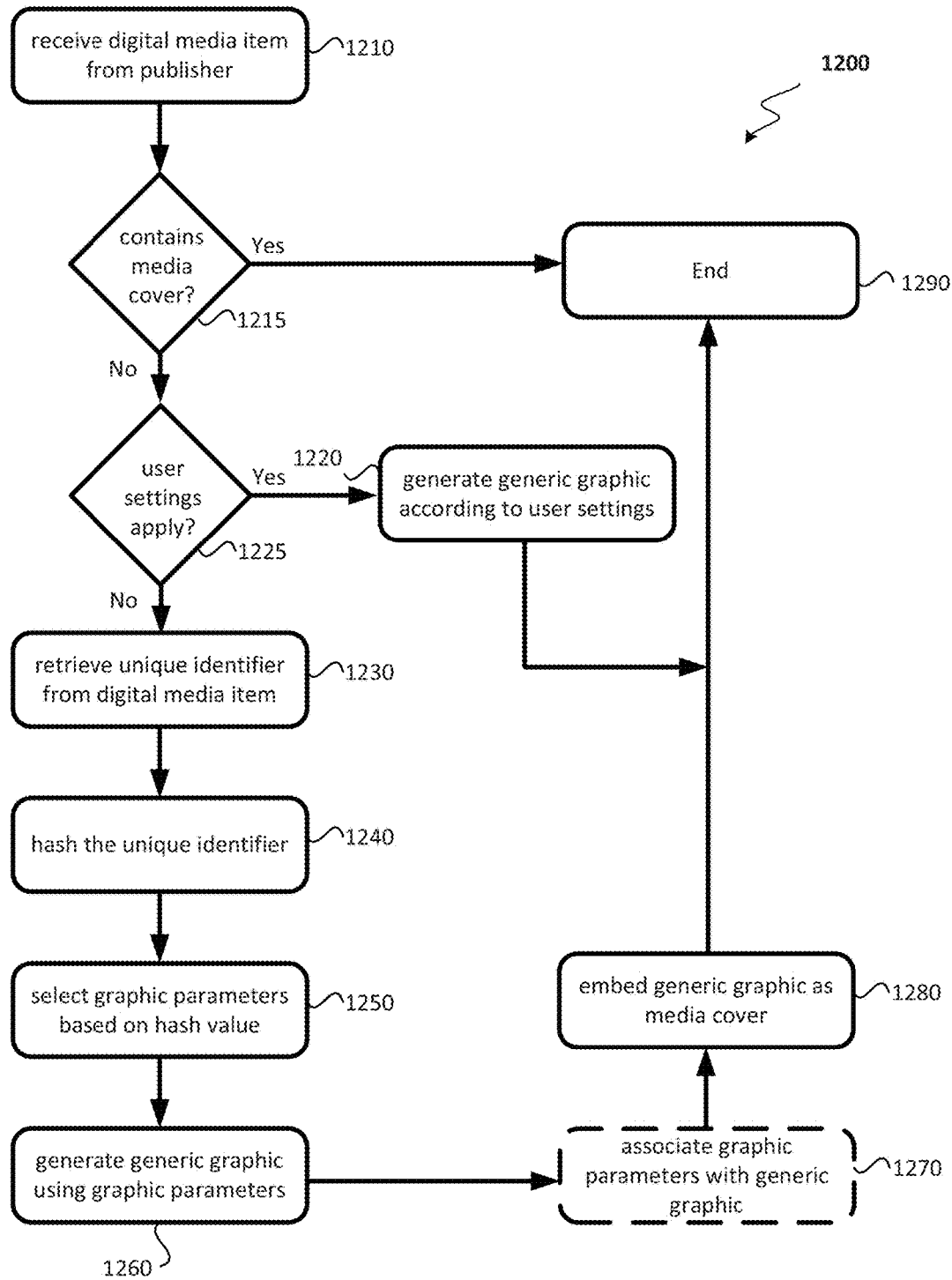
FIG. 12 illustrates an exemplary process for preprocessing a digital media item received from a publisher.

FIG. 12 illustrates an exemplary process for preprocessing a digital media item received from a publisher. The process can be stored as computer readable code and performed by a processor, such as a server on an online store. Process 1200 receives a digital media item from a publisher (1210). The request can include a digital media item such as an eBook, audiobook, or movie, etc. A determination can be made as to whether the received digital media item contains a media cover (1215). If the digital media item does contain a media cover (e.g., personalized media cover), process 1200 can end (1290). The processor can proceed to perform other preprocessing tasks, if any exist. Alternatively if the digital media item does not contain a media cover, process 1200 can proceed to generate a generic graphic as the media cover. Process 1200 can begin by determining whether user settings apply to this digital media item (1225). User settings can be set by a publisher, a user, or the online store to specify certain templates to use for certain eBooks. For example, all eBooks from an author can be specified to use a particular color scheme, a particular template, or use a colors scheme or template from a set of color schemes or templates. As another example, all eBooks of a certain genre can be specified to use a particular color scheme. For instance, user settings can specify that all romance books should be a shade of red or that all books with a theme of deception be a shade of purple. As another example, eBooks of a given status (e.g., pre-ordered, released, etc.) can use a specific theme or set of themes. If user settings do apply to this digital media item, a generic graphic can be generated according to the user settings (1220). If user settings do not exist or do not apply to this particular digital media item, process 1200 can automatically generate the graphic for the media cover. A unique identifier from the digital media item can be retrieved (1230). The unique identifier can be part of metadata associated with the digital media item, such as the UniqueID, ISBN, manifest, or other data associated with the digital media item that remains consistent throughout the lifecycle of the digital media item. The unique identifier or a predefined portion of the unique identifier can be hashed to generate a hash value (1240). In some examples, the hash function used can be random and/or uniformly distributed. This can result in a uniform distribution of generic book covers in the media library of the online store.

Using the hash value, graphic parameters can be selected (1250). A predetermined portion of the hash value can be input into a dictionary and translated into a graphic parameter. For example, the leftmost byte of the hash value can be translated by a dictionary into a template for the generic graphic while the second byte from the left of the hash value can be translated by another dictionary into a color scheme for the generic graphic. After graphic parameters have been selected according to the hash value, a generic graphic can be generated using the graphic parameters (1260). For example, a generic graphic can be generated based on a template and a color scheme. Title and author information can be rendered on top of the generic graphic. In other examples, other media item metadata such as the ISBN, genre, and theme can be rendered on the generic graphic. The generic graphic can be generated at a default resolution, such as the preferred resolution for display on the online store. After the generic graphic is generated, the graphic parameters used to generate the generic graphic can optionally be associated with the generic graphic (1270). In some examples, the graphic parameters do not need to be saved because they are not used by the client to regenerate the generic graphic. For instance if the client device regenerates the generic graphic by using the desired resolution and the UniqueID of the eBook, the graphic parameters do not need to be saved because they can be determined by the client device from the UniqueID. As another example, the client device may not need the graphic parametrs because the client device transmits all requests to regenerate a generic graphic to the server. In the embodiments where the graphic parameters are saved, the graphic parameters can be attached as metadata on the generic graphic, thus allowing applications or devices accessing the generic graphic to also gain access to the graphic parameters used in generating the generic graphic. Alternatively, the graphic parameters can be stored separately on the eBook metadata or on a separate file associated with the eBook. The generic graphic can subsequently be embedded as a media cover on the digital media item (1280). If other preprocessing tasks exist, they can then be performed (1290). In other examples, process 1200 can be performed in a different order or with different instructions.

In some embodiments a combination of user settings and a generic graphic can also be used. For example if a setting specifies a color, that color can be used while the rest of the graphic is completed with the generic elements.

Figure 13:
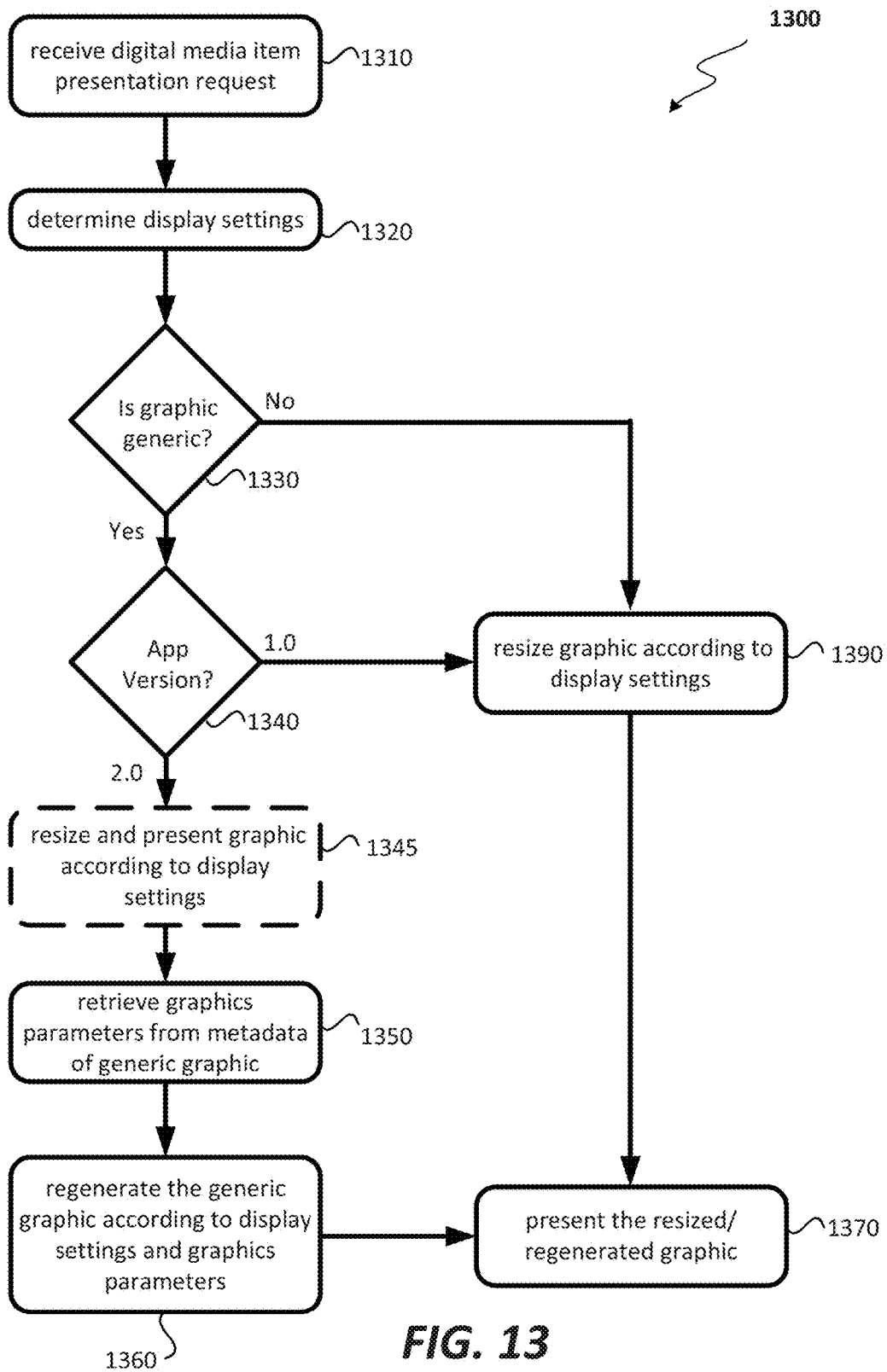
FIG. 13 illustrates an exemplary process to regenerate a graphic.

FIG. 13 illustrates an exemplary process to regenerate a graphic. Regenerating a graphic can occur on the client device when a generic graphic in a different resolution is desired or on the server-side in response to a client request for the generic graphic in a different resolution. The process can be stored as computer readable code and performed by a processor, such as a server on an online store or a client device. In one example, the client device may regenerate the graphic at the desired resolution when the graphic is requested by the client device. A processor performing the instructions can regenerate a generic graphic associated with a digital media item at a desired resolution according to metadata of the generic graphic. For example, graphic parameters of the generic graphic can be utilized by process 1300 to regenerate the graphic at a desired resolution or size. The library of graphic parameters and instructions on how to process the graphic parameters can be stored in the application or processor executing process 1300, thus allowing process 1300 to generate a generic graphic using one or more of the graphic parameters. Process 1300 begins by receiving a presentation request for a digital media item (1310). The request can come from a client device running the application, another application on the client device, or an online store. A presentation request can be a user request or an application request to present cover art associated with a digital media item.

Process 1300 can proceed to determine the display settings (1320). The display settings can include the screen resolution or the desired resolution or size of the graphic as it is presented on the screen. Afterwards, a determination is made as to whether the graphic is generic (1330). This can include checking a flag or metadata embedded in the graphic. If the graphic is not generic (i.e., the graphic is a personalized graphic that was attached to the digital media item), then process 1300 should present the graphic. The graphic can be resized according to the display settings (1390). If the graphic is generic, a determination is made as to the version of the application (1340). The version of the application can be determined by checking a version field of the application. If the version of the application is 1.0 (or some other predetermined version number), then the application is not configured to regenerate graphics. Thus, process 1300 continues by resizing or rescaling the graphic according to the display settings (1390). This can include upsizing or downsizing the graphic. If the application version is 2.0 (or some other predetermined version number capable of regenerating graphic images), then process 1300 can optionally proceed to resizing and presenting the graphic according to the display settings (1345). The graphic that was received with the digital media item can be temporarily displayed to the use while the graphic is being regenerated according to the display settings. Once the graphic is regenerated presentation of the original graphic can end and be replaced with the newly generated graphic. Therefore, the presentation of the digital media item will not be dependent on the regeneration of the graphic since the graphic can be resized and presented to the user while the new graphic is being regenerated. Depending on the amount of time that is needed to regenerate the graphic, step 1345 can be skipped. After optionally presenting the graphic, graphics parameters can be retrieved from metadata of the generic graphic (1350). The graphic parameters received can include the template, color scheme, font, and others. Alternatively, the graphic parameters can be determined based on other metadata of the digital media item. For example, the UniqueID of the digital media item can be processed in a similar fashion as described in FIG. 8. As another example, the title and author of the eBook can be used to locate the digital media item on the server and the UniqueID of the digital media item can be processed in a similar fashion as described in FIG. 8. The generic graphic can then be regenerated according to the display settings and the graphics parameters (1360). For example, display settings may specify that the desired resolution of the graphic is 300 pixels by 200 pixels.

However, the graphic associated with the digital media item is 150 pixels by 100 pixels. As a result, the application can regenerate the graphic using the graphics parameters to ensure that the graphic image has the same look but with greater clarity and quality at the larger size of 300 pixels by 200 pixels. Process 1300 can end with the presentation of the resized or regenerated graphic (1370). In some examples, the presentation of the regenerated graphic can replace the presentation of the resized graphic in step 1345. In other examples, process 1200 can be performed in a different order or with different instructions.

Figure 14:
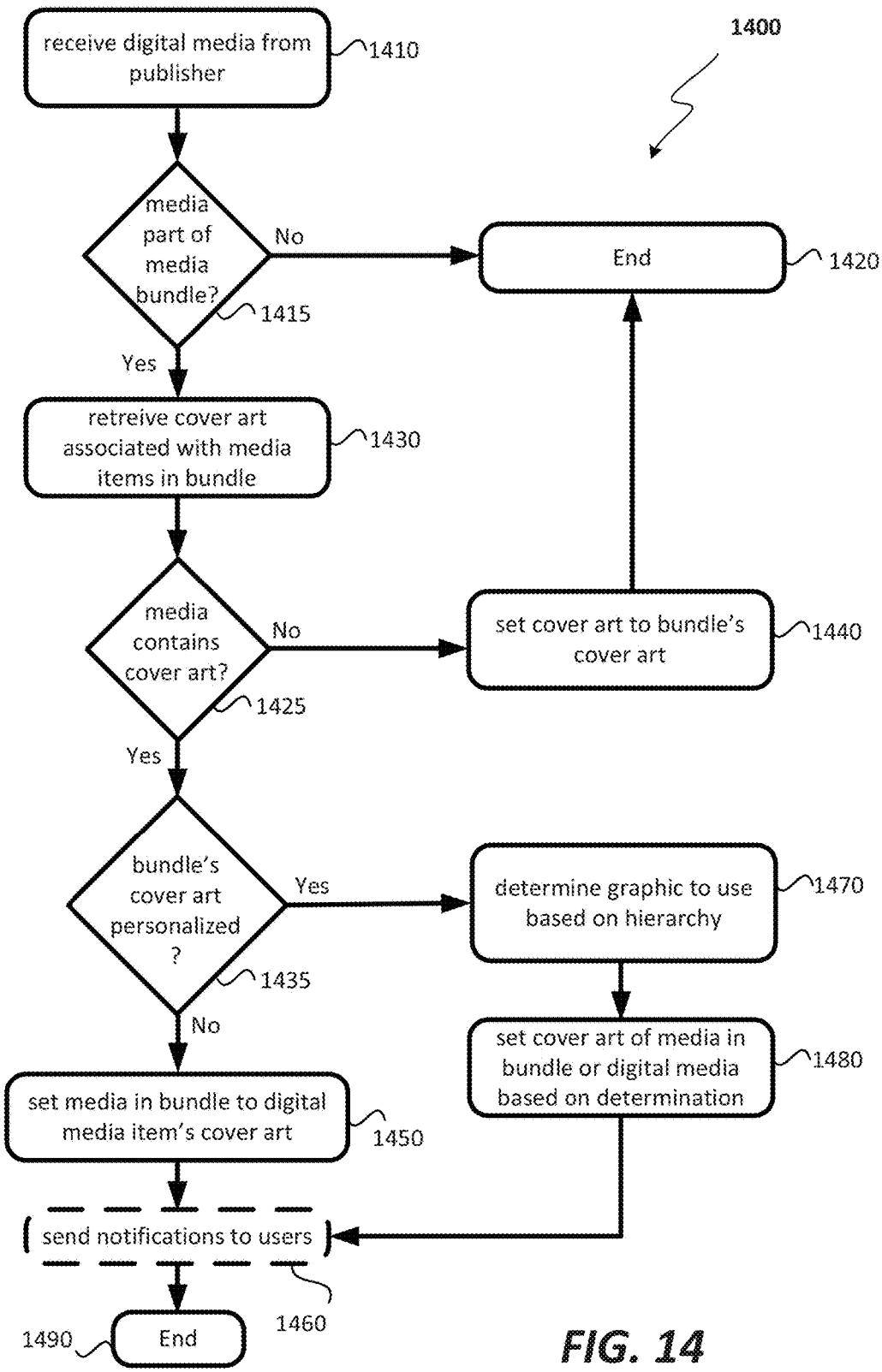
FIG. 14 illustrates an exemplary process for preprocessing a digital media item received from a publisher.

FIG. 14 illustrates an exemplary process for preprocessing a digital media item received from a publisher. The preprocessing can be performed by the online store after the digital media item is received from the publisher but before the digital media item is offered for sale. Process 1400 illustrates an exemplary process for bundling cover art. As discussed above, cover art and media cover are synonymous. Both include a graphic that is used to identify a digital media item. The process can be stored as computer readable code and performed by a processor, such as a server on an online store. Process 1400 can be configured as a means to process digital media items as they are received by the online store to ensure that media items belonging to the same bundle contain cover art that appear similar. For example, a bundle can include a title such as "Romeo and Juliet" in multiple formats, such as eBook, audiobook, and movie. As another example, a bundle can include a series of books. Here, process 1400 begins by receiving a digital media item from a publisher (1410). A determination is then made as to whether the digital media item is part of an existing media bundle (1415). In one example, a query can be performed on one or more media libraries accessible by the processor to search for digital media items based on the title, author, or other attribute of the digital media item. In another example, the publisher can specify whether the digital media item belongs to a bundle. For instance, a bundleID field embedded in the digital media item can be used to determine whether the media item belongs to a bundle. A digital media item that does not belong to a bundle can have an empty bundleID field.

If the digital media item is not part of a bundle, the process ends (1420). The digital media item can continue to be normally processed to check the existence of cover art by performing a process similar to process 1200 of FIG. 12. Alternatively if the digital media item is part of a media bundle, the cover art associated with media items in the bundle is retrieved (1430). In one example, a look up table or a hash can be applied to the bundleID to retrieve a cover art that is associated with media items in the bundle. Media items in the media library that belong to the same bundle can be associated with the same cover art and a hash of the bundleID can return that cover art. In another example, a search can be performed on a media library for media items having the same title, author, or other attributes of the digital media item. For instance, a search can be performed on the media library for media having the same title as the digital media item. The bundle's cover art can be the cover art for a media item in the media library that has the same title as the digital media item.

After the bundle's cover art is retrieved, a determination is made as to whether cover art is associated with the digital media item (1425). This determination can be made by checking the graphic field in the metadata of the digital media item. In one example, the digital media item may not contain cover art when the publisher did not specify cover art for the digital media item. If the digital media item was submitted from the publisher without cover art, the bundle's cover art can be set as the cover art of the digital media item (1440). As described in FIG. 12, generic cover art can be generated for a digital media item that is submitted without cover art. However, it may be desirable to use personalized cover art over automatically generated cover art since personalized cover art was manually selected and thus is likely better representative of the digital media item than generic cover art. In one example, setting the cover art can include copying the bundle's cover art as the digital media item's cover art. In another example, setting the cover art can include storing the UniqueID of a digital media item in the bundle in a field of the digital media item such as a GroupUniqueID field. During processing, the GroupUniqueID can be selected instead of the UniqueID of the digital media item as the unique identifier to use when generating a generic cover. As a result, digital media items in the same bundle can automatically generate the same generic cover when personalized cover art is not provided. After setting the cover art of the digital media item to the bundle's cover art, process 1400 ends (1420).

Alternatively if the digital media item does contain cover art, then a determination is made as to whether the bundle's cover art is personalized (e.g., set by the publisher, user, or other party) (1435). This can be determined by examining a flag or other metadata of the bundle's cover art. If the bundle's cover art is not personalized (i.e., generic cover art) and the digital media item submitted does contain cover art, then the digital media item's cover art is preferred over the bundle's generic cover art that was automatically set by the online store or a client device. Process 1400 can set the cover art of media items in the bundle to the digital media item's cover art (1450). In one example, setting the cover art can include copying the cover art of the digital media item to other media item's in the bundle. In another example, setting the cover art can include storing the UniqueID of the digital media item in a special field such as a GroupUniqueID field. During processing, the GroupUniqueID can be selected instead of the UniqueID as the unique identifier to use when generating a generic cover. As a result, digital media items in the same bundle can automatically generate the same generic cover when personalized cover art is not provided. At this point, all media items in the bundle and the digital media item are associated with the same cover art. Since the cover art for media items in the bundle were previously generic and are now have been changed, a notification optionally can be sent to users (1460). The notification can notify users that new cover art is available for download. In some examples, the notification can be similar to the notification described in FIGS. 10 and 11. After notifications have been sent, process 1400 ends (1490).

If the bundle's cover art is personalized and the digital media item does contain cover art (i.e., both cover arts are personalized), process 1400 determines the cover art that should be applied to the digital media items in the bundle (1470). In one example, the determination can be made based on a hierarchy. The hierarchy may specify an ordering based on the type of digital media. For instance, the hierarchy may specify that cover art from a movie should be selected if available. If movie cover art is not available, then cover art from an eBook should be selected if available. If eBook cover art is not available, then cover art from an audio book should be selected if available. This can continue resulting in a hierarchy of digital media types where cover art associated with a media type higher in the hierarchy takes precedence over cover art associated with a media types lower in the hierarchy. In another example, the determination can be made by selecting the newest cover art. This would result in the cover art of the digital media item being selected over the bundle's cover art. In yet another example, the determination can be made by selecting the oldest cover art. This would result in the bundle's cover art being selected.

Once the determination has been made, process 1400 can set the cover art of the digital media item or the cover art of media items in the bundle to the appropriate cover art based on the determination (1480). If changes were made to the cover art of media items that already exist in the media library (i.e., media items in the bundle), a notification can be optionally sent to users to notify them of the updated cover art (1460). After the notifications have been sent, process 1400 ends (1490).

In other examples, the publisher can submit a digital media item with a bundleID field that is set to a unique identifier of another digital media item. During processing of the cover art of the digital media item, the bundleID, when available, can be used instead of the digital media item's unique identifier. This can result in the generic cover art of the digital media item being substantially similar to the generic cover art of the another digital media item. This can be another method of generating similar generic cover art for digital media items that are related.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, solid state drives, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied other types of files to control the secure deletion of those files and other copies of those files from storage. Those skilled in the art will readily recognize various modifications and changes that may be made to the principles described herein without following the example embodiments and applications illustrated and described herein, and without departing from the spirit and scope of the disclosure.

We claim:

1. A computer implemented method, comprising: determining that a digital media item having a unique metadata item is missing a media cover;
    hashing the unique metadata item to generate a hash value;
    translating a first portion of the hash value into a first graphic parameter, wherein the first graphic parameter specifies a first attribute of a generic media cover;
    translating a second portion of the hash value into a second graphic parameter, wherein the second graphic parameter specifies a second attribute of the generic media cover;
    generating the generic media cover based on the first graphic parameter and the second graphic parameter; and associating the generic media cover to the digital media item.

2. The computer implemented method of claim 1, wherein the unique metadata item is set to a unique metadata item of a second digital media item so that the generic media cover of the digital media item is substantially similar to a generic media cover of the second digital media item.

3. The computer implemented method of claim 1, wherein the first graphic parameter is a color scheme from a collection of color schemes and the first portion of the hash value comprises a byte of the hash value, wherein the byte of the hash value is translated into the first graphic parameter.

4. The computer implemented method of claim 1, wherein generating the generic media cover comprises:
    selecting a template from a collection of templates based on a third graphic parameter, wherein the third graphic parameter specifies a third attribute of the digital media item;
    generating a generic graphic according to the template; and
    rendering the generic graphic within the generic media cover.

5. The computer implemented method of claim 4, wherein the third attribute is a title of the digital media item.

6. The computer implemented method of claim 1, wherein associating the generic media cover to the digital media item comprises storing the generic media cover in a media cover field of the digital media item.

7. The computer implemented method of claim 1, wherein the first portion of the hash value is translated by a first dictionary and the second portion of the hash value is translated by a second dictionary.

8. A computer implemented method, comprising:
determining that a first digital media item of a first type is to be part of a media bundle of one or more grouped digital media items, wherein the media bundle includes a second digital media item of a second type;
retrieving bundle cover art associated with the media bundle, wherein the bundle cover art is automatically generated generic cover art;
determining that the first digital media item has corresponding personalized cover art; and
replacing the automatically generated generic cover art with the corresponding personalized cover art of the first digital media item.

9. The computer implemented method of claim 8, further comprising:
determining that the bundle cover art is generic; and
updating the bundle cover art with item cover art associated with the first digital media item when the first digital media item was received.

10. The computer implemented method of claim 9, further comprising:
notifying users of media in the media bundle of the update.

11. The computer implemented method of claim 9, further comprising:
receiving, from a user, acceptance of the updated bundle cover art; and
transmitting the updated bundle cover art to the user.

12. The computer implemented method of claim 9, further comprising:
determining that the bundle cover art is personalized;
selecting one of the automatically generated generic cover art or an item cover art based on a hierarchy specifying an ordering of media types; and
updating the media bundle or the first digital media item according to the selection.

13. The computer implemented method of claim 12, wherein selecting one of the automatically generated generic cover art or the item cover art comprises:
ranking the first digital media items of the media bundle by a media type attribute according to the hierarchy;
determining a highest ranked digital media item; and
selecting whichever of the automatically generated generic cover art or the item cover art is associated with the highest ranked media item.

14. The computer implemented method of claim 12, further comprising:
notifying users of media in the media bundle of the update when the item cover art is selected.

15. The computer implemented method of claim 14, further comprising:
receiving, from a user, acceptance of the updated bundle cover art; and
transmitting the updated bundle cover art to the user.

16. A non-transitory computer readable medium comprising computer program code causing a device to perform a method comprising:
determining that a digital media item having a unique metadata item is missing a media cover;
hashing the unique metadata item to generate a hash value;
translating a first portion of the hash value into a first graphic parameter, wherein the first graphic parameter specifies a first attribute of a generic media cover;
translating a second portion of the hash value into a second graphic parameter, wherein the second graphic parameter specifies a second attribute of the generic media cover;
generating the generic media cover based on the first graphic parameter and the second graphic parameter; and
associating the generic media cover to the digital media item.

17. The non-transitory computer readable medium of claim 16, wherein the unique metadata item is set to a unique metadata item of a second digital media item so that the generic media cover of the digital media item is substantially similar to a generic media cover of the second digital media item.

18. The non-transitory computer readable medium of claim 16, wherein generating the generic media cover comprises:
selecting a template from a collection of templates based on a third graphic parameter, wherein the third graphic parameter specifies a third attribute of the digital media item;
generating a generic graphic according to the template; and
rendering the generic graphic within the generic media cover.

19. The non-transitory computer readable medium of claim 18, wherein the third attribute is a title of the digital media item.

20. A non-transitory computer readable medium comprising computer program code causing a device to perform a method comprising:
determining that a first digital media item of a first type is to be part of a media bundle of one or more grouped digital media items, wherein the media bundle includes a second digital media item of a second type;
retrieving bundle cover art associated with the media bundle, where the bundle cover art is automatically generated generic cover art by:
determining that the first digital media item has corresponding personalized cover art; and
replacing the bundle cover art with the corresponding personalized cover art of the first digital media item.

21. A system comprising:
at least one processor;
at least one storage device;
at least one memory configured to store instructions for controlling the at least one processor to perform steps comprising:
determining that a digital media item having metadata is missing a media cover;
hashing the metadata to generate a hash value;
translating a first portion of the hash value into a first graphic parameter, wherein the first graphic parameter specifies a first attribute of a generic media cover;
translating a second portion of the hash value in to a second graphic parameter, wherein the second graphic parameter specifies a second attribute of the generic media cover;
generating the generic media cover based on the first graphic parameter and the second graphic parameter; and
associating the generic media cover to the digital media item.

22. The system of claim 21, wherein the first portion of the hash value is translated by a first dictionary and the second portion of the hash value is translated by a second dictionary.

23. The non-transitory computer readable medium of claim 21, wherein the first portion of the hash value is translated by a first dictionary and the second portion of the hash value is translated by a second dictionary.

24. A system comprising:
   at least one processor;
   at least one storage device;
   at least one memory storing instructions for controlling the at least one processor to perform steps comprising:
   determining that a first digital media item of a first type is to be part of a media bundle of one or more grouped digital media items, wherein the media bundle includes a second digital media item of a second type;
   retrieving bundle cover art associated with the media bundle, wherein the bundle cover art is automatically generated generic cover art by:
   replacing the automatically generated generic cover art with personalized cover art of one of the first or second digital media item.

25. The computer implemented method of claim 7, wherein the first dictionary is a collection of color schemes and the second dictionary is a collection of templates.

26. The system of claim 24, wherein replacing the automatically generated generic cover art with personalized cover art of one of the first or second digital media item comprises:
   determining a hierarchical ranking between the first type and second type of digital media items; and
   replacing the automatically generated generic cover art with the personalized cover art of the first type when the hierarchical ranking of the first type is greater than the second type.

* * * * *